(12) United States Patent
Ohira et al.

(10) Patent No.: US 8,995,957 B2
(45) Date of Patent: *Mar. 31, 2015

(54) COMMUNICATION APPARATUS, COMMUNICATION METHOD AND COMMUNICATION SYSTEM

(71) Applicant: Panasonic Intellectual Property Corporation of America, Torrance, CA (US)

(72) Inventors: Tomoaki Ohira, Tokyo (JP); Masaru Yamaoka, Osaka (JP); Michihiro Matsumoto, Shiga (JP); Toshiaki Ohnishi, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,623

(22) Filed: Jul. 7, 2014

(65) Prior Publication Data

US 2014/0315488 A1 Oct. 23, 2014

Related U.S. Application Data

(63) Continuation of application No. 13/576,761, filed as application No. PCT/JP2011/006806 on Dec. 5, 2011, now Pat. No. 8,792,859.

(30) Foreign Application Priority Data

Dec. 6, 2010 (JP) ................. 2010-271665

(51) Int. Cl.
*H04W 12/06* (2009.01)
*H04B 5/00* (2006.01)
*G08C 17/02* (2006.01)

(52) U.S. Cl.
CPC .............. *H04B 5/0031* (2013.01); *G08C 17/02* (2013.01); *G08C 2201/21* (2013.01); *G08C 2201/91* (2013.01)
USPC .......................... 455/410; 455/411; 455/41.1

(58) Field of Classification Search
CPC ..... H04W 12/06; H04W 4/008; H04W 4/001; H04W 84/18; H04W 8/02; H04W 88/02; H04B 5/00

USPC .................. 455/410, 411, 41.1, 420, 88, 230; 717/178, 174
See application file for complete search history.

(56) References Cited

U.S. PATENT DOCUMENTS 6,636,272 B1 10/2003 Noguchi et al.
7,237,029 B2 6/2007 Hino et al.
(Continued)

FOREIGN PATENT DOCUMENTS

JP 10-93665 4/1998
JP 2000-050102 2/2000
(Continued)

OTHER PUBLICATIONS

International Search Report issued Mar. 6, 2012 in International Application No. PCT/JP2011/006806.

(Continued)

*Primary Examiner* — Minh D Dao
(74) *Attorney, Agent, or Firm* — Wenderoth, Lind & Ponack, LLP

(57) ABSTRACT

A repeater apparatus includes a network communication unit that acquires, from a server through a network, first terminal identification information for identifying a terminal to be controlled and control information for controlling the terminal to be controlled, a near-field communication unit that acquires, by near-field communication from the terminal, second terminal identification information for identifying the terminal and stored in the terminal, and a comparison unit that decides whether the first terminal identification information agrees with the second terminal identification information. The near-field communication unit transmits the control information to the terminal by near-field communication, in the case where the comparison unit decides that the first terminal identification information agrees with the second terminal identification information.

6 Claims, 24 Drawing Sheets

(56) References Cited

U.S. PATENT DOCUMENTS

| | | |
|---|---|---|
| 7,259,696 B1 | 8/2007 | Lee et al. |
| 7,737,862 B2 | 6/2010 | Watanabe |
| 7,904,051 B2 | 3/2011 | Takahashi et al. |
| 7,936,287 B1 | 5/2011 | Lee et al. |
| 8,014,746 B2 | 9/2011 | Takahashi et al. |
| 8,209,754 B2* | 6/2012 | Cheon et al. .................... 726/20 |
| 8,396,421 B2* | 3/2013 | Kuroda et al. ................ 455/41.1 |
| 8,457,024 B2* | 6/2013 | Teruyama ..................... 370/294 |
| 8,527,987 B2* | 9/2013 | Johansson et al. ............. 717/178 |
| 8,646,034 B2* | 2/2014 | Murakami et al. ................ 726/2 |
| 8,792,859 B2* | 7/2014 | Ohira et al. .................... 455/410 |
| 2002/0069276 A1 | 6/2002 | Hino et al. |
| 2006/0143572 A1 | 6/2006 | Scott et al. |
| 2006/0270458 A1 | 11/2006 | Watanabe |
| 2007/0055633 A1* | 3/2007 | Cheon et al. .................... 705/65 |
| 2007/0268360 A1 | 11/2007 | Ahlgen |
| 2008/0051073 A1 | 2/2008 | Takahashi et al. |
| 2008/0235406 A1 | 9/2008 | Meijer et al. |
| 2010/0075597 A1 | 3/2010 | Tamura |
| 2010/0185545 A1* | 7/2010 | Royyuru et al. ................ 705/67 |
| 2011/0053501 A1* | 3/2011 | Teruyama ..................... 455/41.1 |
| 2011/0082567 A1 | 4/2011 | Takahashi et al. |
| 2011/0087752 A1 | 4/2011 | Takahashi et al. |
| 2011/0199250 A1 | 8/2011 | Lee et al. |
| 2011/0202465 A1* | 8/2011 | Mashhour ....................... 705/67 |
| 2011/0231922 A1* | 9/2011 | Azuma ............................ 726/9 |
| 2013/0015956 A1* | 1/2013 | Wegelin et al. .............. 340/10.1 |
| 2013/0125195 A1 | 5/2013 | Lee et al. |
| 2013/0205414 A1* | 8/2013 | Jussila ........................... 726/30 |

FOREIGN PATENT DOCUMENTS

| | | |
|---|---|---|
| JP | 2002-44765 | 2/2002 |
| JP | 2006-325046 | 11/2006 |
| JP | 2008-203790 | 9/2008 |
| JP | 2009-94634 | 4/2009 |
| JP | 2009-288859 | 12/2009 |
| JP | 2010-114694 | 5/2010 |
| WO | 2005/122543 | 12/2005 |
| WO | 2007/135598 | 11/2007 |

OTHER PUBLICATIONS

Extended European Search Report issued Jun. 4, 2014 in corresponding European patent application No. 11847565.6.

* cited by examiner

FIG. 19

Menu for Mr/Ms User A

1. See operation manual
2. See use history information
3. Make up function information
4. Use function information
5. Transmit function information

COMMUNICATION APPARATUS, COMMUNICATION METHOD AND COMMUNICATION SYSTEM

This application is a continuation of application Ser. No. 13/576,761, now U.S. Pat. No. 8,792,859, which is the National Stage of International Application No. PCT/JP2011/006806, filed Dec. 5, 2011.

BACKGROUND OF THE INVENTION

1. Technical Field

The present invention relates to a communication apparatus that performs near-field communication with a terminal to thereby transmit control information to the terminal, and a method and a system for performing such communication.

2. Description of the Related Art

Communication apparatuses that perform near-field communication thus far developed include, for example as disclosed in Japanese Unexamined Patent Application Publication No. 2008-203790, one applicable to an electronic signboard system that displays electronic data such as advertisements, and designed to sequentially update the advertisement content displayed on the electronic signboard.

In the electronic signboard system according to JP 2008-203790, the advertisement content, transmitted from a server and containing a signboard identifier indicating the signboard on which the content is to be displayed, is stored in a repeater apparatus. The repeater apparatus transmits the advertisement content that agrees with the signboard identifier, read out from the signboard by near-field communication or the like, to the signboard through short-range communication.

SUMMARY OF THE INVENTION

1. Technical Problem

The foregoing configuration has, however, a drawback in that the repeater apparatus may transmit the advertisement content to a wrong signboard.

More particularly, in the case of transmitting the advertisement content from the repeater apparatus through short-range communication, for example in compliance with Infrared Data Association (IrDA), in a location where a plurality of electronic signboards is aligned, the user of the repeater apparatus may direct the repeater apparatus to a signboard different from the one from which the signboard identifier was read out beforehand. If communication is established with the different signboard, the advertisement content is transmitted to the different signboard.

The present invention has been accomplished to solve the foregoing problem, and provides a communication apparatus, a communication method, and a communication system that can prevent transmission of information received from a server to a wrong terminal.

2. Solution to the Problem

In an aspect, the present invention provides a communication apparatus that communicates with a terminal by near-field communication and with a server through a network. The communication apparatus includes a network communication unit configured to acquire, from the server through the network, first terminal identification information for identifying a terminal to be controlled and control information for controlling the terminal to be controlled, a first near-field communication unit configured to acquire, by near-field communication from the terminal to communicate with, second terminal identification information for identifying the terminal to communicate with, the second terminal identification information being stored in the terminal to communicate with, and a comparison unit configured to decide whether the first terminal identification information and the second terminal identification information agree with each other. The first near-field communication unit is configured to transmit the control information by near-field communication to the terminal to communicate with, in the case where the comparison unit decides that the first terminal identification information and the second terminal identification information agree with each other.

As described above, the communication apparatus according to the present invention decides, before transmitting the control information received from the server through the network to the terminal by near-field communication, whether the terminal is the one corresponding to the control information. In addition, the communication apparatus makes such decision by using the second terminal identification information for identifying the terminal, acquired therefrom by near-field communication, and the first terminal identification information acquired from the server together with the control information. The communication apparatus then transmits the control information to the terminal in the case where the aforementioned two pieces of terminal identification information agree with each other. Such a configuration prevents the communication apparatus from transmitting the control information received from the server to a wrong terminal.

Preferably, the first near-field communication unit may be configured to establish the near-field communication with the terminal to communicate with on the basis of a polling directed to the terminal to communicate with and a response to the polling from the terminal to communicate with, and receive the second terminal identification information as the response to the polling.

With such an arrangement, the communication apparatus can receive the second identification information more promptly, by receiving the second identification information in response to the polling for establishing the communication.

Preferably, the terminal to communicate with may include a second near-field communication unit configured to perform near-field communication, and the first near-field communication unit may be configured to acquire near-field identification information for identifying the second near-field communication unit, as the second terminal identification information.

Preferably, the second near-field communication unit may include a near-field communication memory in which the near-field identification information is stored and from which the near-field identification information can be read out from outside by near-field communication, and the first near-field communication unit may be configured to read out the near-field identification information stored in the near-field communication memory, by near-field communication.

The foregoing arrangement enables the communication apparatus to identify the terminal even when the identification information of the terminal is unavailable.

Preferably, the control information may further include certification information, and the communication apparatus may further include a security verification unit configured to verify by using the certification information whether the control information has been falsified, and the first near-field communication unit may be configured to transmit the control information by near-field communication to the terminal to communicate with, in the case where the security verification unit verifies that the control information has not been falsified.

Such a configuration improves the security level in communication between the communication apparatus and the server.

Preferably, the network communication unit may be configured to acquire from the server a plurality of pieces of the control information and a plurality of pieces of the first terminal identification information, each associated with a corresponding one of the plurality of pieces of the control information and indicating a terminal to be controlled with the associated control information. The comparison unit may be configured to identify, among the plurality of pieces of the first terminal identification information, first terminal identification information that agrees with the second terminal identification information, and the first near-field communication unit may be configured to transmit, by near-field communication to the terminal to communicate with, the control information associated with the first terminal identification information identified by the comparison unit to agree with the second terminal identification information.

In this case, the communication apparatus can acquire the control information corresponding to a plurality of terminals, which allows the user to acquire the desired control information through a simpler operation.

Preferably, the communication apparatus may further include a display unit, and the display unit may be configured to display a warning, in the case where the comparison unit decides that the first terminal identification information and the second terminal identification information do not agree with each other.

Such a configuration enables the communication apparatus to notify the user of a result of the near-field communication.

Preferably, the first terminal identification information may be encrypted, and the communication apparatus may further include a cryptography unit configured to decrypt the first terminal identification information.

Such a configuration further improves the security level in communication between the communication apparatus and the server.

Preferably, the control information may be encrypted, and the cryptography unit may be configured to decrypt only the first terminal identification information, out of the first terminal identification information and the control information.

Such an arrangement enables the communication apparatus to prevent falsification of the control information by an unauthorized communication apparatus.

Preferably, the network communication unit may further be configured to acquire first version information indicating a version of the control information, from the server through the network; the first near-field communication unit may further be configured to acquire, by near-field communication from the terminal to communicate with, second version information indicating a version of the control information for controlling the terminal to communicate with, the second version information being stored in the terminal to communicate with; the comparison unit may be configured to decide whether the version indicated by the first version information and the version indicated by the second version information agree with each other; and the first near-field communication unit may be configured to transmit the control information by near-field communication to the terminal to communicate with, in the case where the comparison unit decides that the first terminal identification information and the second terminal identification information agree with each other, and that the version indicated by the first version information and the version indicated by the second version information do not agree with each other.

With such a configuration, the communication apparatus can compare the status between the control information stored in the terminal and the control information received from the server, to thereby decide that it is not necessary to make communication in the case where updating is not necessary.

Preferably, the first near-field communication unit may be configured to acquire, by near-field communication from the terminal to communicate with, third terminal identification information for identifying the terminal to communicate with, the third terminal identification information being stored in the terminal to communicate with, and the network communication unit may be configured to acquire from the server the control information corresponding to the third terminal identification information acquired by the first near-field communication unit.

Such an arrangement enables the communication apparatus to identify in advance the control information to be received, which leads to reduced communication traffic with the server.

The present invention may be realized not only as the foregoing communication apparatus, but also as a communication method including the distinctive operations performed by the constituents of the communication apparatus. In addition, the present invention may be realized as a program that causes a computer to execute the distinctive operations. Further, such a program may naturally be distributed through a non-transitory computer-readable recording medium such as a CD-ROM or a transmission medium such as the Internet.

Further, the present invention may also be realized as a semiconductor large-scale integrated circuit (LSI) that performs a part or whole of the functions of the foregoing communication apparatus, or as a communication system that includes the communication apparatus.

3. Advantageous Effects of the Invention

Thus, the present invention provides a communication apparatus, a communication method, and a communication system that can prevent transmission of information received from a server to a wrong terminal.

BRIEF DESCRIPTION OF THE DRAWINGS

FIG. 19 is a schematic drawing showing an example of display content according to the embodiment 2.

DETAILED DESCRIPTION OF THE INVENTION

Figure 1:
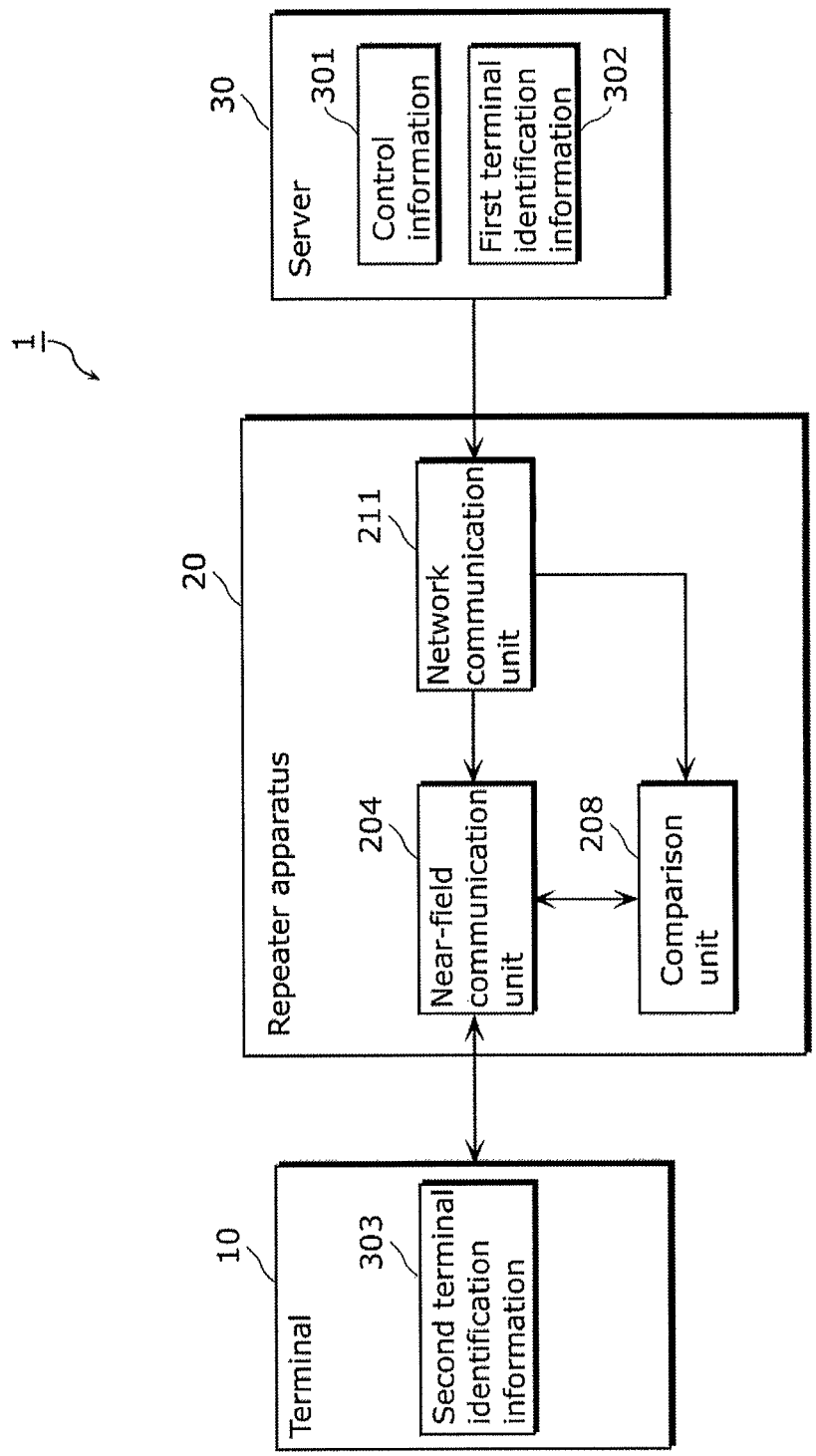
FIG. 1 is a block diagram showing a general configuration of a communication system according to an embodiment 1 of the present invention.

Hereafter, embodiments of the present invention will be described referring to the drawings. The following embodiments are preferred examples of the present invention. Numerical values, shapes, materials, constituents, relationships therebetween, methods, and sequences thereof described in the embodiments are merely exemplary, and in no way intended to limit the present invention. The present invention is limited solely by the appended claims. Therefore, the constituents described in the embodiments but not set forth in independent claims representing the most superordinate concept of the present invention are to be construed as examples of the present invention that may achieve a more preferable form, though not mandatory for achieving the foregoing object of the present invention.

As embodiments of the present invention, a communication system in which information stored in a server is downloaded to a terminal through a repeater apparatus will be described in details, with reference to the drawings. The terminal is designed to perform the near-field communication. The terminal performs the near-field communication with a repeater apparatus. The repeater apparatus is connected to the server through a general-purpose network such as the Internet or a mobile phone network.

1. Embodiment 1

In the communication system according to an embodiment 1 of the present invention, the repeater apparatus decides, when control information acquired from the server is to be transmitted by near-field communication to a terminal to communicate with, whether first terminal identification information acquired from the server for identifying a terminal to be controlled and second terminal identification information for identifying the terminal and stored in the terminal agree with each other. In the affirmative case, the repeater apparatus transmits the control information to the terminal. Such an arrangement prevents the communication system according to the embodiment 1 from transmitting the control information received from the server to a wrong terminal.

First, a general configuration and operation of the communication system 1 according to the embodiment 1 of the present invention will be described.

FIG. 1 is a block diagram showing a general configuration of the communication system 1 according to the embodiment 1.

As shown in FIG. 1, the communication system 1 includes a terminal 10, a repeater apparatus 20, and a server 30. The repeater apparatus 20 is a communication apparatus that performs near-field communication with the terminal 10 and makes communication with the server 30 through a general-purpose network.

The repeater apparatus 20 includes a network communication unit 211, a near-field communication unit 204, and a comparison unit 208.

The network communication unit 211 acquires, from the server 30 through the general-purpose network, first terminal identification information 302 for identifying a terminal to be controlled and control information 301 for controlling the terminal to be controlled.

The near-field communication unit 204 corresponds to the first near-field communication unit according to the present invention, and performs the near-field communication with the terminal 10. The near-field communication unit 204 also acquires, from the terminal 10 by near-field communication, second terminal identification information 303 for identifying the terminal 10 and stored in the terminal 10. In addition, the near-field communication unit 204 transmits the control information 301 acquired by the network communication unit 211 to the terminal 10 by near-field communication.

The comparison unit 208 decides whether the first terminal identification information 302 acquired by the network communication unit 211 and the second terminal identification information 303 acquired by the near-field communication unit 204 agree with each other.

Figure 2:
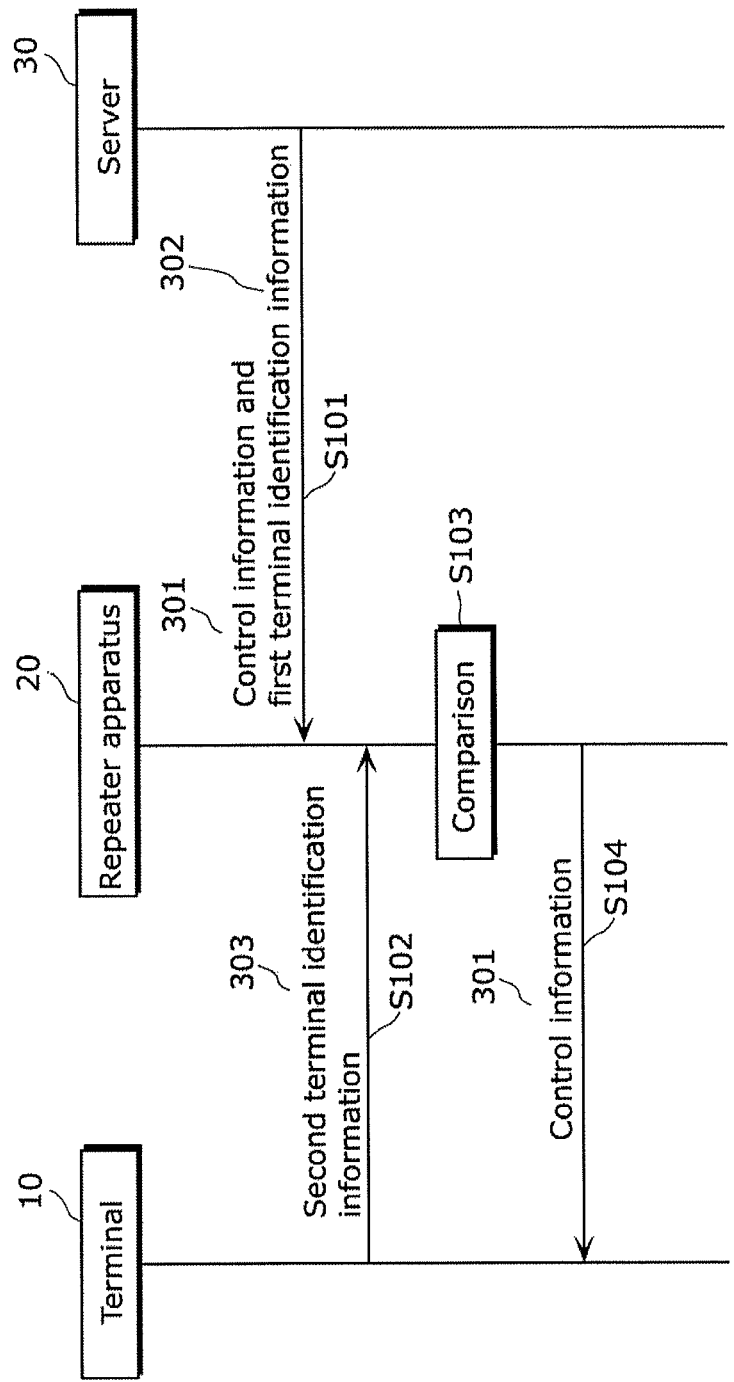
FIG. 2 is a sequence chart showing a process flow in the communication system according to the embodiment 1.

FIG. 2 is a sequence chart showing a process flow in the communication system 1.

First, the network communication unit 211 acquires the first terminal identification information 302 and the control information 301 from the server 30 through the general-purpose network (S101). It is to be noted that the first terminal identification information 302 and the control information 301 are registered in advance in the server 30 by the user.

The near-field communication unit 204 then acquires the second terminal identification information 303 stored in the terminal 10, from the terminal 10 by near-field communication (S102). More specifically, the near-field communication unit 204 establishes the near-field communication with the terminal 10 by a polling operation and a response thereto from the terminal 10. Thus, the near-field communication unit 204 receives the second terminal identification information 303 in response to the polling operation.

Then the comparison unit 208 decides whether the first terminal identification information 302 acquired at the step S101 and the second terminal identification information 303 acquired at the step S102 agree with each other (S103).

In the case where the comparison unit 208 decides that the first terminal identification information 302 and the second terminal identification information 303 agree with each other at the step S103, the near-field communication unit 204 transmits the control information 301 acquired at the step S301 to the terminal 10, by near-field communication (S104).

In the case, on the contrary, where the comparison unit 208 decides that the first terminal identification information 302 and the second terminal identification information 303 do not agree with each other at the step S103, the near-field communication unit 204 does not transmit the control information 301 acquired at the step S301 to the terminal 10.

As described above, the repeater apparatus 20 according to the embodiment 1 transmits the control information 301 to the terminal 10, only when the first terminal identification information 302 acquired from the server 30 together with the control information 301 and the second terminal identification information 303 acquired from the terminal 10 agree with each other. Accordingly, the repeater apparatus 20 is prevented from transmitting the control information 301 received from the server 30 to a wrong terminal.

Hereafter, the configuration and operation of the communication system 1 according to the embodiment 1 will be described in further details.

Figure 3:
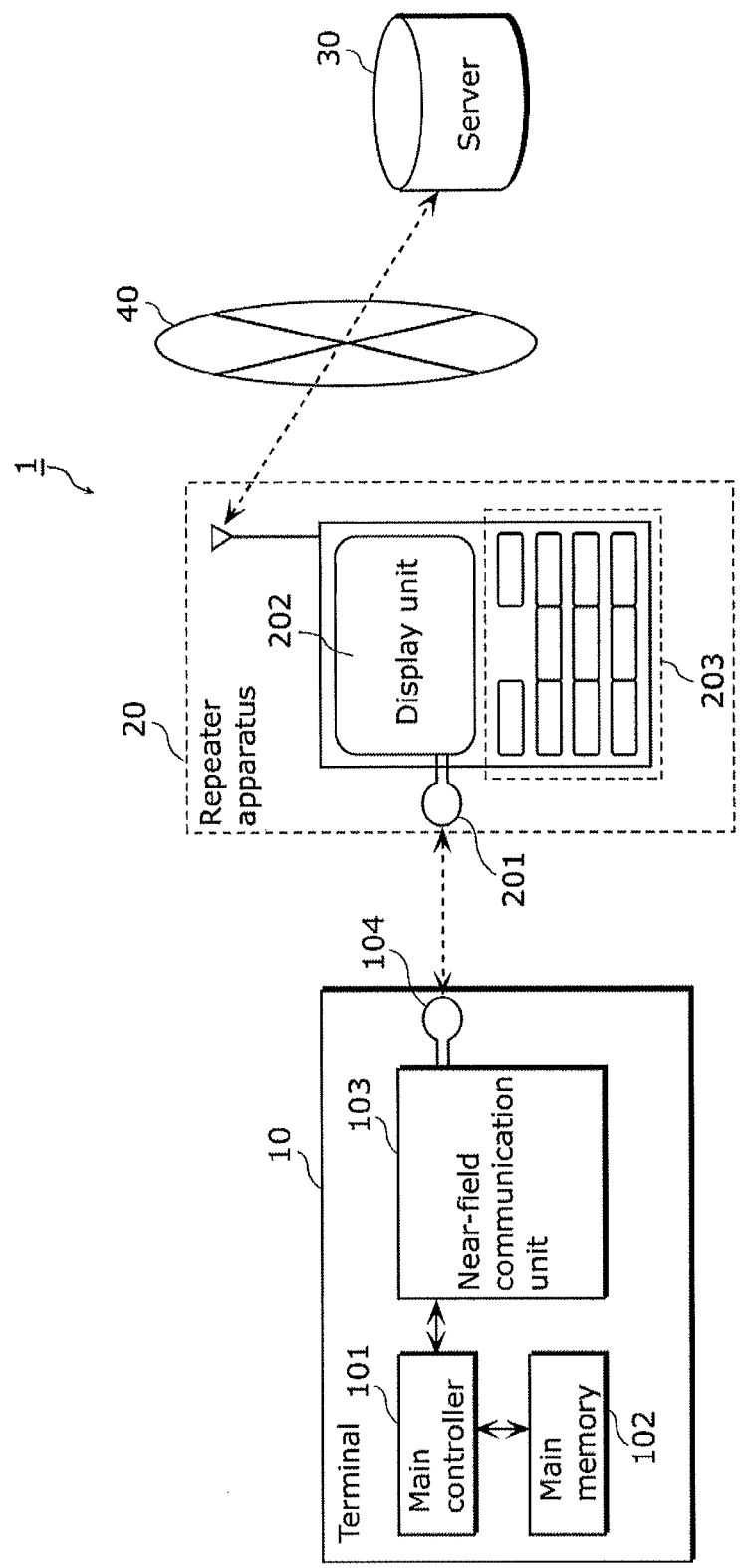
FIG. 3 is a block diagram showing a configuration of the communication system according to the embodiment 1.

FIG. 3 is a block diagram showing an overall configuration of the communication system 1 according to the embodiment 1.

The communication system 1 shown in FIG. 3 includes the terminal 10, the repeater apparatus 20, and the server 30.

The terminal 10 and the repeater apparatus 20 can mutually communicate by near-field communication. In this embodiment, the near-field communication will be assumed to be (1) communication between a reader-writer apparatus and a radio-frequency identification (RFID, ISO14443) tag that utilizes 13.56 MHz band (HF band) by electromagnetic induction or radiowave of 52 to 954 MHz band (UHF band), or (2) communication that utilizes near-field communication, (NFC, ISO/IEC21481) at 13.56 MHz band. Normally, the communication distance is limited to tens of centimeters in the HF band and a few centimeters in the UHF band. Accordingly, the repeater apparatus 20 has to be brought closely opposite (or into touch with) the terminal 10, to establish the communication therebetween.

This embodiment exemplifies the case where the repeater apparatus 20 is implemented with a reader-writer function, and the terminal 10 is implemented with an IC tag function. Instead, the repeater apparatus 20 may be implemented with the IC tag function and the terminal 10 may be implemented with the reader-writer function. Thus, in this embodiment it suffices that the terminal 10 and the repeater apparatus 20 are configured so as to exchange information by near-field communication. In addition, for the NFC a P-to-P communication function, tag emulation, and reader-writer emulation are standardized. In this case it is not an issue which of those functions is given to the terminal 10 and the repeater apparatus 20. This embodiment adopts the configuration in which the repeater apparatus 20 is implemented with the reader-writer function and the terminal 10 is implemented with the IC tag function, for the sake of convenience of description.

The terminal 10 includes a main controller 101, a main memory 102, a near-field communication unit 103, and an antenna 104.

The main controller 101 may be, for example, a CPU serving as a system controller for the terminal 10. The main controller 101 controls at least the system of the terminal 10.

The main memory 102 can store therein control software driven by the main controller 101 and all data detected by the terminal 10. The main memory 102 is normally implemented in an LSI that contains the main controller 101. Alternatively, the main memory 102 may be implemented in an external memory outside the LSI containing the main controller 101. For example, the main memory 102 may be a RAM or a non-volatile memory.

The near-field communication unit 103 corresponds to the second near-field communication unit according to the present invention, and makes communication with a reader-writer apparatus implemented in the repeater apparatus 20. The near-field communication unit 103 modulates data to be transferred to the reader-writer apparatus, and demodulates data transferred from the reader-writer apparatus.

The antenna 104 is, for example, a loop antenna utilized for the terminal 10 to perform near-field communication with the reader-writer apparatus implemented in the repeater apparatus 20.

The repeater apparatus 20 includes an antenna 201, a display unit 202, and an input unit 203.

The antenna 201 is employed for the repeater apparatus 20 to perform the near-field communication with the terminal 10.

The repeater apparatus 20 performs the polling operation toward the IC tag in the terminal 10. Upon establishing the communication, the repeater apparatus 20 reads out information from the terminal 10, or writes information in the terminal 10.

The display unit 202 displays data obtained as a result of the near-field communication between the repeater apparatus 20 and the terminal 10, and data transmitted from the server 30. The display unit 202 may be, for example, an LCD panel.

The input unit 203 is an interface through which the user operates the repeater apparatus 20. The repeater apparatus 20 activates the near-field communication unit 204 installed therein, in accordance with an input by the user through the input unit 203. Upon activating the near-field communication unit 204, the repeater apparatus 20 starts the polling operation toward the terminal 10 for establishing the near-field communication therewith. Normally, radiowave is continuously transmitted to unspecified parties during a polling operation, which is disadvantageous in power consumption to the repeater apparatus 20 which is battery-driven. Accordingly, providing an exclusive button for the polling on the repeater apparatus 20 suppresses the repeater apparatus 20 from performing unnecessary polling operations, and alleviates the operational trouble of the user.

The server 30 contains a database. The server 30 is typically constituted of a WEB server containing a database. The server 30 is connected to the repeater apparatus 20 through the network 40. For example, the server 30 registers information transmitted from the repeater apparatus 20 on the database, and transmits information indicating the result of the registration to the repeater apparatus 20. Upon receipt of such information, the repeater apparatus 20 displays that information on the display unit 202.

With the foregoing system configuration, information acquired through sensing by the terminal 10 can be registered on the database of the server 30 through the repeater apparatus 20. For example, the repeater apparatus 20 reads out information that allows the terminal 10 to be uniquely identified, such as a serial number, a model number, and manufacturer identification information, from the terminal 10 by near-field communication. The repeater apparatus 20 also transfers, to the server 30, information received from the terminal 10 by near-field communication, information stored in the repeater apparatus 20 for identifying the user or the repeater apparatus 20 itself, and, in the case where the repeater apparatus 20 is capable of sensing position information, the information for identifying the position. Examples of the information for identifying the user or the repeater apparatus 20 include a mail address, a telephone number, mobile terminal identification information, or a subscriber identity module (SIM) card ID. Examples of the information for identifying the position include global positioning system (GPS) information, assisted GPS (A-GPS) information, or position information estimated on the basis of a base station in the mobile phone network. The server 30 registers such information on the database. The foregoing series of operations exempt the user from the trouble of inputting various kinds of information. Practically, the user can execute customer registration with the terminal 10 simply by bringing the repeater apparatus 20 closely opposite the terminal 10.

The terminal 10 according to the embodiment 1 will now be described in details, referring to the drawings.

Figure 4:
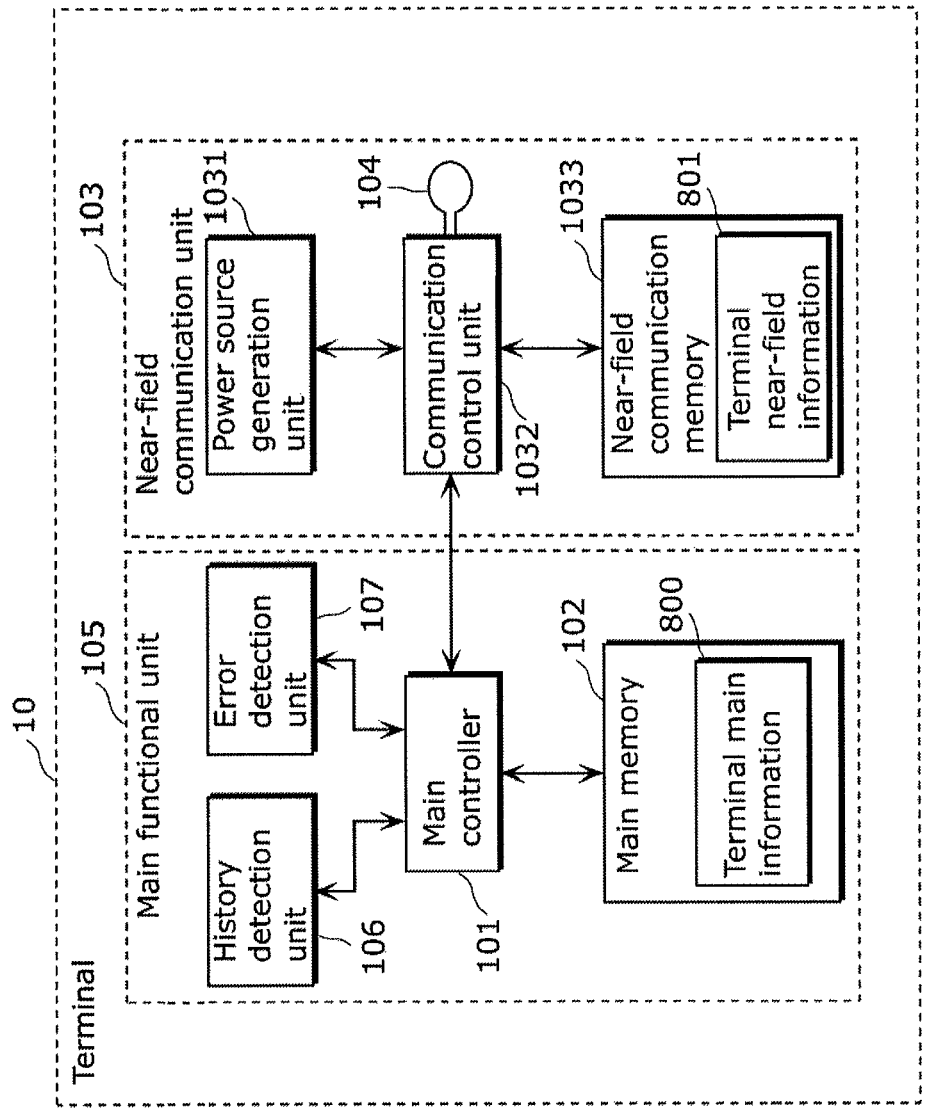
FIG. 4 is a block diagram showing a configuration of a terminal according to the embodiment 1.

FIG. 4 is a block diagram showing a configuration of the terminal 10 according to the embodiment 1.

As shown in FIG. 4, the terminal 10 includes a main functional unit 105, and a near-field communication unit 103. The main functional unit 105 and the near-field communication unit 103 are connected to each other through a mutually communicable interface, such as a serial interface or USB.

The main functional unit 105 realizes the primary function of the terminal 10. The main functional unit 105 performs, for example, a cooling function when the terminal 10 is a refrigerator, a heating function when the terminal 10 is a microwave oven, and an air-conditioning function when the terminal 10 is an air-conditioner. The terminal 10 according to the embodiment 1 broadly encompasses all electronic terminals and home electric appliances. Accordingly, in the embodiment 1 the description of each individual apparatus will not be made, and only those functions common to all the apparatuses will be described. Here, the terminal 10 may be other than the electronic terminals and home electric appliances. For example, the terminal 10 may be a vehicle such as an automobile, or an agricultural machine.

The main functional unit 105 includes a history detection unit 106, an error detection unit 107, a main memory 102, and a main controller 101.

The history detection unit 106 generates history information 1022 including operation history information indicating an operation history of the terminal 10 and use history information indicating operations realized by the user.

The error detection unit 107 detects a malfunction of the main functional unit 105 and generates error information 1023 indicating the detail of the malfunction.

The main memory 102 stores therein terminal main information 800 including the history information 1022 generated by the history detection unit 106 and the error information 1023 generated by the error detection unit 107.

Figure 5:
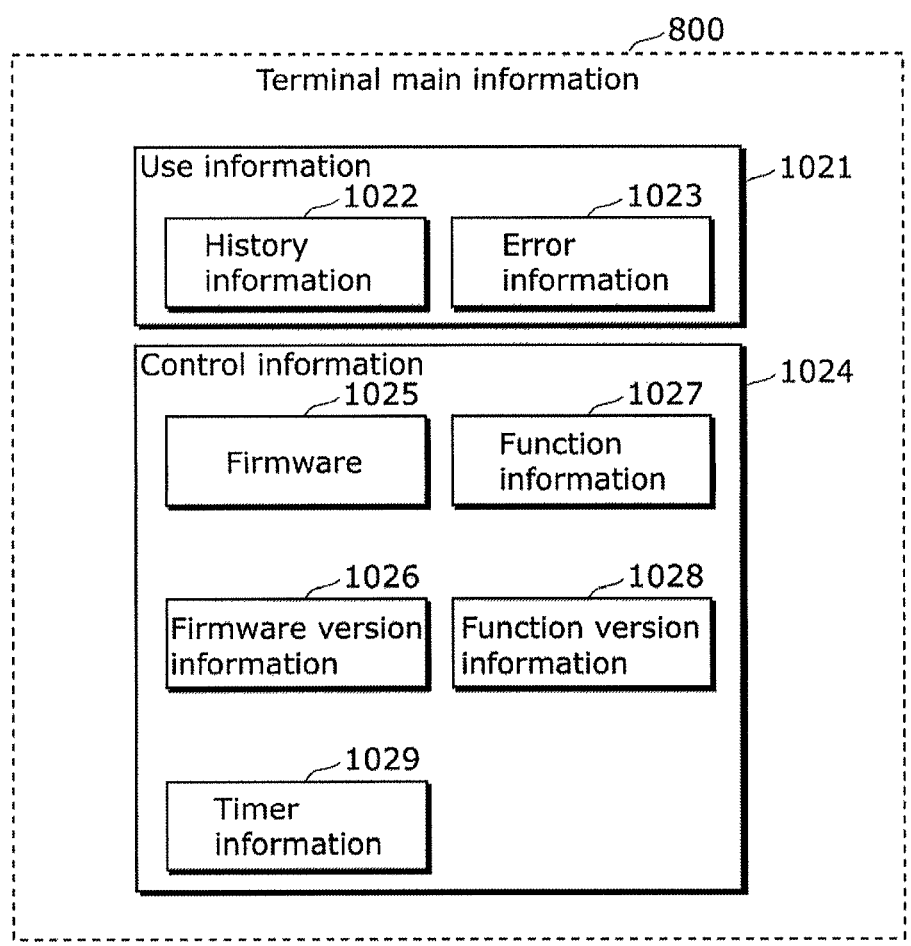
FIG. 5 is a schematic drawing showing a configuration of terminal main information according to the embodiment 1.

FIG. 5 is a schematic drawing showing a configuration of the terminal main information 800 stored in the main memory 102 according to the embodiment 1.

As shown in FIG. 5, the main memory 102 contains use information 1021 and control information 1024.

The use information 1021 includes the history information 1022 generated by the history detection unit 106 and the error information 1023 generated by the error detection unit 107.

The control information 1024 includes a firmware 1025 installed in advance by the manufacturer as the control process of the main controller 101, firmware version information 1026 indicating the version thereof, function information 1027 to be added when the user subsequently downloads a function, function version information 1028 indicating the version thereof, and timer information 1029 indicating an elapsed time between controlled operations. The function information 1027 is software implemented with function information and automatic setting for the terminal 10, such as an addition of a recipe to a microwave oven and a cooking program to a rice cooker.

Referring again to FIG. 4, the near-field communication unit 103 includes a power source generation unit 1031, a communication control unit 1032, and a near-field communication memory 1033.

The power source generation unit 1031 rectifies radiowave from the repeater apparatus 20 received through the antenna 104, to thereby generate a power source for driving the near-field communication unit 103.

The communication control unit 1032 performs the near-field communication with the repeater apparatus 20 through the antenna 104, records information in the near-field communication memory 1033, and reads out information therefrom.

The near-field communication memory 1033 stores therein terminal near-field information 801, including identification information that allows the terminal 10 to be identified. The near-field communication memory 1033 can be read from an external apparatus such as the repeater apparatus 20, by near-field communication.

Figure 6:
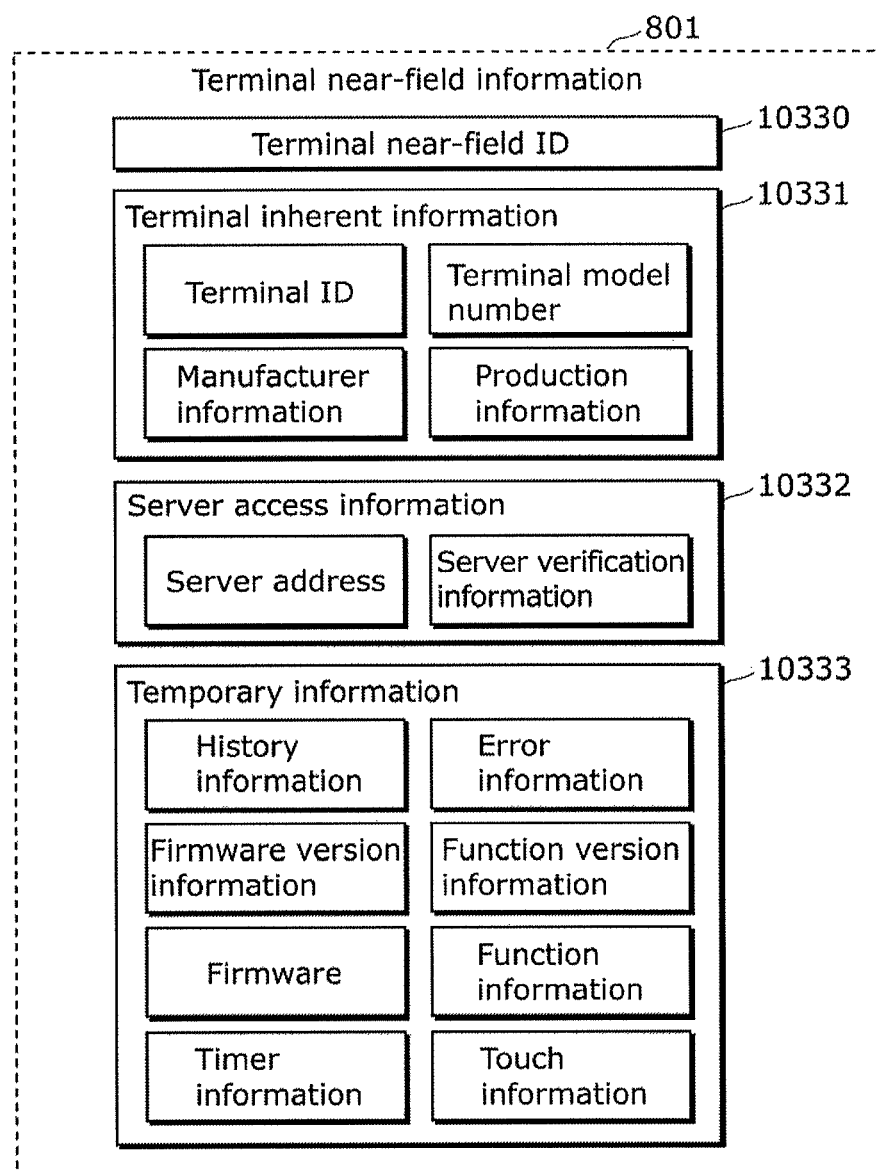
FIG. 6 is a schematic drawing showing a configuration of terminal near-field information according to the embodiment 1.

FIG. 6 is a schematic drawing showing a configuration of the terminal near-field information 801 stored in the near-field communication memory 1033 according to the embodiment 1.

As shown in FIG. 6, the near-field communication memory 1033 contains a terminal near-field ID 10330 that allows the near-field communication unit 103 to be uniquely identified, and terminal inherent information 10331. The terminal inherent information 10331 includes at least one of a terminal ID (for example, serial number), a terminal model number, manufacturer information, and production information (production lot, production date, and so forth) recorded in the manufacturing process of the terminal 10. The terminal near-field ID 10330 and the terminal inherent information 10331 are specific examples of the second terminal identification information 303 shown in FIG. 1. In addition, the terminal near-field ID 10330 corresponds to the near-field identification information according to the present invention. Transmitting such information from the terminal 10 to the server 30 through the repeater apparatus 20 enables the manufacturer to identify the terminal 10.

The terminal near-field information 801 also includes server access information 10332 which is required when the repeater apparatus 20 transfers information read out from the terminal 10 by near-field communication, to the server 30. The server access information 10332 includes a server address (uniform resource locator (URL)), server verification information (log-in account and password), and so forth.

Further, the terminal near-field information 801 includes temporary information 10333 to be transferred to the reader-writer apparatus or transferred therefrom. The temporary information 10333 includes the history information 1022 extracted by the history detection unit 106 of the main functional unit 105, the error information 1023 detected by the error detection unit 107, the firmware 1025, the function information 1027, the version information thereof (firmware version information 1026 and function version information 1028), the timer information 1029, and touch information indicating that the repeater apparatus 20 has been brought closely opposite the terminal 10.

Among the above, the terminal inherent information 10331 and the server access information 10332 are recorded in the manufacturing process of the terminal 10. Such an arrangement prevents terminal information of a company A from being transferred to a server of a company B which is different from the company A. To a company, information such as the user operation history of the company's product is quite valuable data that should not be leaked to another company. Accordingly, the terminal inherent information 10331 and the server access information 10332 are typically recorded in the manufacturing process of the terminal 10. Therefore it is preferable that the near-field communication memory 1033 include an unrewritable ROM region. Here, the ROM region may physically be constituted of a rewritable flash memory or the like. In this case, however, the ROM region is managed as a read-only region by the reader-writer apparatus implemented in the repeater apparatus 20. Such an arrangement prevents malicious operations such as spoofing by illegally rewriting the identification information, falsification of the server access information, and so forth, thereby upgrading the security level.

In contrast, the temporary information 10333 is only temporarily stored for the communication with the reader-writer apparatus. Accordingly, it is preferable that the region in which the temporary information 10333 is to be stored be physically constituted of a rewritable flash memory or the like.

With the foregoing configuration, the terminal 10 according to the embodiment 1 offers the following advantages. For example, the near-field communication unit 103 generates power that is at least sufficient for establishing the near-field communication on the basis of the radiowave from the reader-writer apparatus, and extracts a clock signal from the radiowave from the reader-writer apparatus. Thus, at least the near-field communication unit 103 of the terminal 10 works with the power and clock obtained from the radiowave from the reader-writer apparatus. Such a configuration enables the near-field communication unit 103 to perform the near-field communication with the repeater apparatus 20, even when the main power of the terminal 10 is turned off.

The main controller 101 stores the use information 1021 in the main memory 102 in the near-field communication memory 1033, once the error detection unit 107 detects an error. Accordingly, even though the main functional unit 105 fails to operate because of the detected error, the use history that has led to the error can be stored in the near-field communication memory 1033. Consequently, the use information 1021 can be read out by an apparatus having a reader-writer function, such as the repeater apparatus 20. This allows the manufacturer to reproduce the failure on the basis of the error information, thereby facilitating the analysis of the malfunction.

Further, when the firmware and the function information are transferred from the reader-writer apparatus to the near-field communication memory 1033, the terminal 10 stores the firmware and the function information in the main memory 102. Therefore, the function of the terminal 10 can be expanded so as to fit the desire of the user, for example when the manufacturer updates the firmware, or when the user adds a function exclusive to the terminal 10 after purchasing the same.

In addition, the near-field communication memory 1033 stores, each time the repeater apparatus 20 is brought closely opposite the terminal 10, touch information indicating for example the aggregated number of times that the repeater apparatus 20 has been brought close and the corresponding time of day. Therefore, combining such touch information with the timer information stored in the terminal 10 enables the terminal 10 to manage the history information and the error information in association with the time of day, even though the terminal 10 is not provided with a clock function.

The repeater apparatus 20 according to the embodiment 1 will now be described in details, referring to the drawings.

Figure 7:
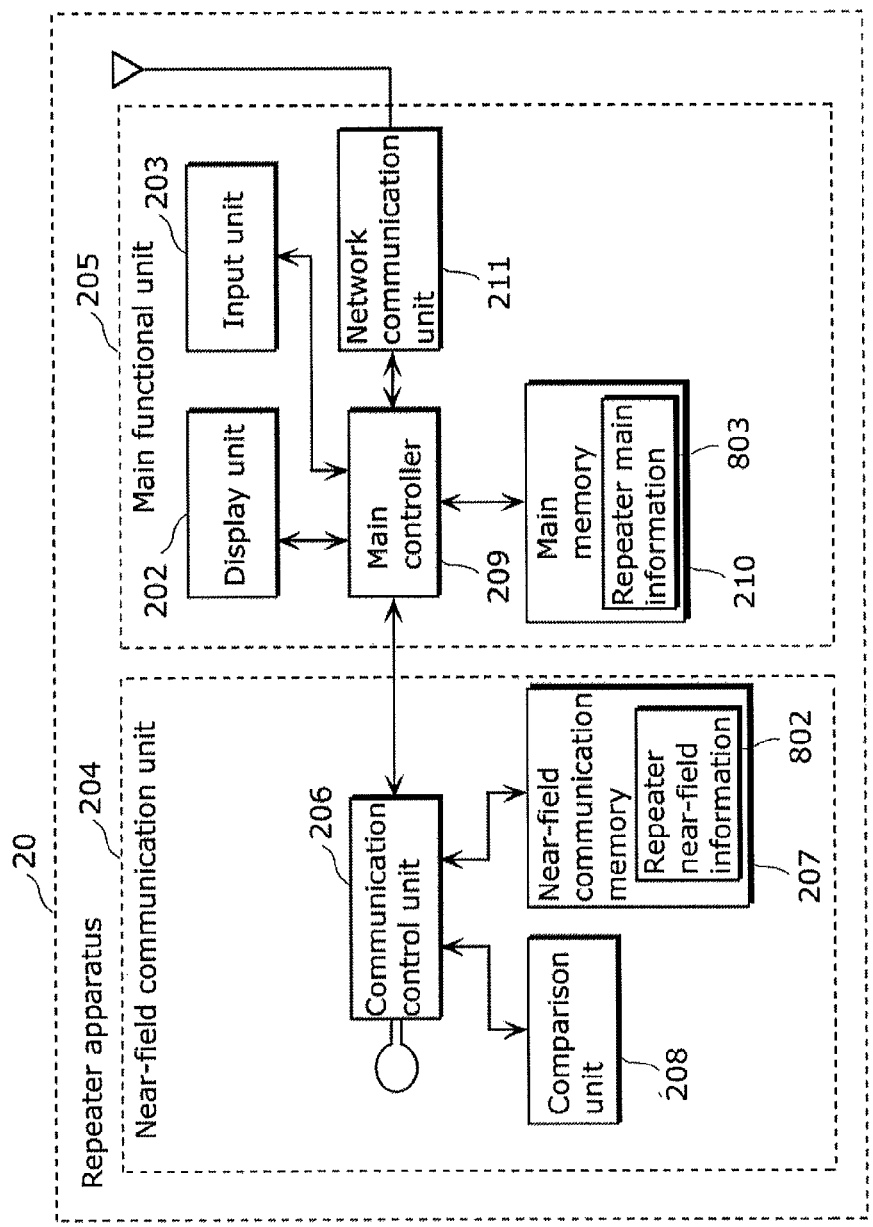
FIG. 7 is a block diagram showing a configuration of a repeater apparatus according to the embodiment 1.

FIG. 7 is a block diagram showing a configuration of the repeater apparatus 20 according to the embodiment 1.

As shown in FIG. 7, the repeater apparatus 20 includes the near-field communication unit 204 and the main functional unit 205.

The near-field communication unit 204 includes a communication control unit 206, a near-field communication memory 207, and the comparison unit 208. Although the near-field communication unit 204 includes the comparison unit 208 according to FIG. 7, the comparison unit 208 may be provided outside the near-field communication unit 204. In other words, it suffices that the comparison unit 208 be included at least in the repeater apparatus 20.

The communication control unit 206 performs the near-field communication with the terminal 10 through the antenna 201, records information in the near-field communication memory 207, and reads out information therefrom.

The near-field communication memory 207 stores therein repeater near-field information 802, including information read out from the terminal 10 by near-field communication and information received from the server 30.

Figure 8:
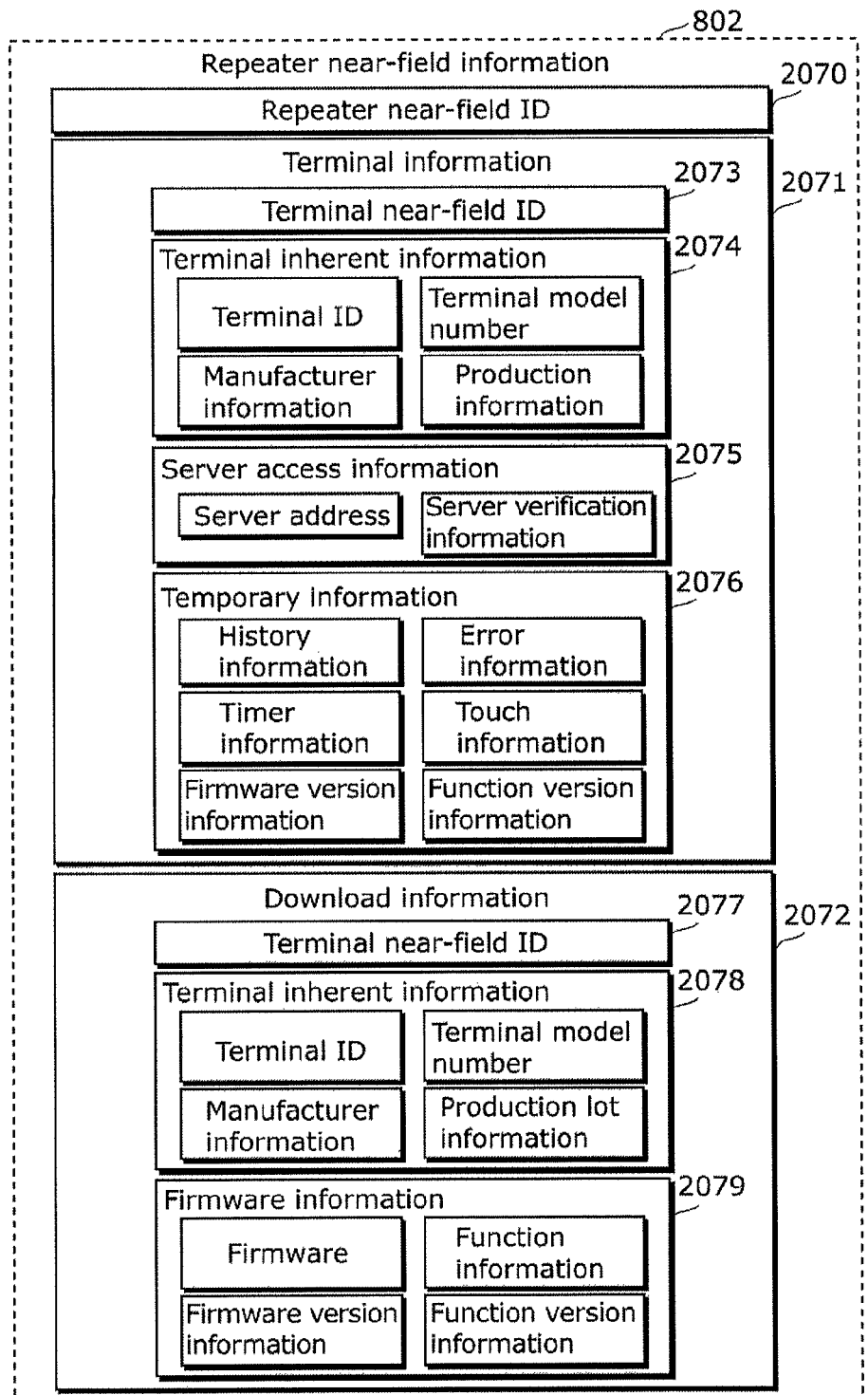
FIG. 8 is a schematic drawing showing a configuration of repeater near-field information according to the embodiment 1.

FIG. 8 is a schematic drawing showing a configuration of the repeater near-field information 802 stored in the near-field communication memory 207 according to the embodiment 1.

As shown in FIG. 8, the near-field communication memory 207 contains a repeater near-field ID 2070, terminal information 2071, and download information 2072.

The repeater near-field ID 2070 is the identification information that allows the near-field communication unit 204 to be uniquely identified.

The terminal information 2071 is information read out from the terminal 10 by near-field communication, and includes a terminal near-field ID 2073, terminal inherent information 2074, server access information 2075, and temporary information 2076. These pieces of information are identical to the respective information stored in the near-field communication memory 1033 of the terminal 10 (terminal near-field ID 10330, terminal inherent information 10331, server access information 10332, and temporary information 10333), at the point immediately after the repeater apparatus 20 has performed the near-field communication with the terminal 10.

The download information 2072 is information received from the server 30 through the network communication unit 211, and includes a terminal near-field ID 2077, terminal inherent information 2078, and firmware information 2079.

Among the information related to the near-field communication memory 207, the repeater near-field ID 2070 allows unique identification of the near-field communication unit 204. Accordingly, it is preferable that the near-field communication memory 207 store the repeater near-field ID 2070 in the unrewritable ROM region. Here, the ROM region may physically be constituted of a rewritable flash memory or the like. In this case, however, the ROM region is managed as a read-only region by an external apparatus. In contrast, the terminal information 2071 and the download information 2072 are rewritten each time the terminal 10 to read from or write in is switched. Accordingly, the near-field communication memory 207 includes a rewritable RAM region, to store such information therein. It is preferable that the RAM region be physically constituted of a rewritable flash memory or the like.

The comparison unit 208 compares two pieces of information stored in the near-field communication memory 207, to thereby decide whether they are the same. For example, the comparison unit 208 compares, before transmitting the download information 2072 received from the server 30 to the terminal 10, the information for identifying the terminal 10 read out therefrom by near-field communication, for example the terminal near-field ID 2073, with the information received from the server 30, for example the terminal near-field ID 2077. Then the comparison unit 208 transmits the comparison result to the communication control unit 206. In the case where the comparison unit 208 decides that those two pieces of information agree with each other, the communication control unit 206 transmits the firmware information 2079 stored in the near-field communication memory 207 to the terminal 10 through the antenna 201.

The main functional unit 205 includes the display unit 202, the input unit 203, a main controller 209, a main memory 210, and the network communication unit 211. The main functional unit 205 realizes the primary function of the repeater apparatus 20. The main functional unit 205 corresponds to a unit that performs a phone communication function when the repeater apparatus 20 is a mobile phone, and a computing function when the repeater apparatus 20 is a personal computer. The repeater apparatus 20 according to the embodiment 1 broadly encompasses all types of mobile terminals and personal computers. Accordingly, in the embodiment 1 the description of each individual apparatus will not be made, and only those functions common to all the apparatuses will be described.

The main controller 209 is a system controller, typically exemplified by a microcomputer or a CPU, which controls the operation of at least the near-field communication unit 204, and makes instructions to store information acquired from the server 30 in the main memory 210 and the near-field communication memory 207.

More specifically, the main controller 209 performs the near-field communication with the terminal 10 through the communication control unit 206, to thereby read out the identification information of the terminal 10 and use history made by the user. Then the main controller 209 transmits such information to a server address contained in the server access information 2075 that has been read out. Further, in the case where the information received from the server 30 is menu information, the main controller 209 displays that information on the display unit 202. In the case where the information received from the server 30 is the firmware information to be transferred to the terminal 10, the main controller 209 stores the received data in the near-field communication memory 207, and displays a message to the effect that the data is ready to be transferred to the terminal 10, on the display unit 202.

The main memory 210 stores therein repeater main information 803 including identification information that allows the repeater apparatus 20 to be identified.

Figure 9:
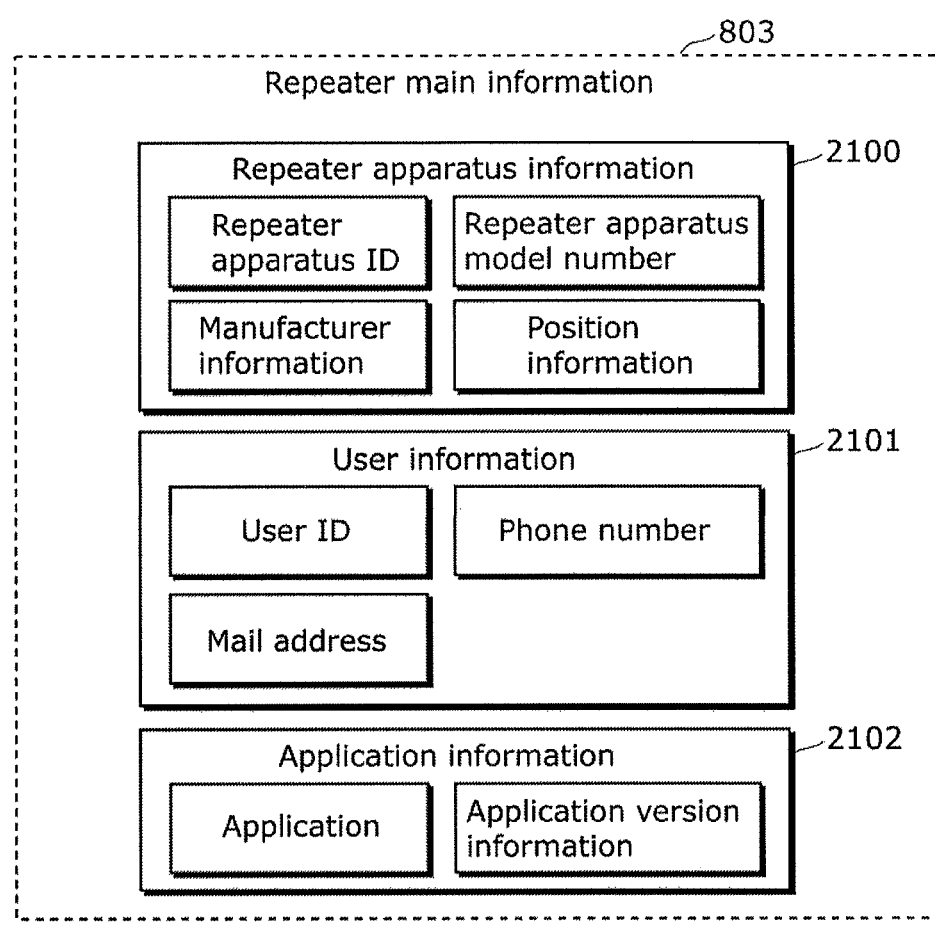
FIG. 9 is a schematic drawing showing a configuration of repeater main information according to the embodiment 1.

FIG. 9 is a schematic drawing showing a configuration of the repeater main information 803 stored in the main memory 210 according to the embodiment 1.

As shown in FIG. 9, the main memory 210 contains repeater apparatus information 2100, user information 2101, and application information 2102.

The repeater apparatus information 2100 includes at least one of a repeater apparatus ID (for example, serial number), a repeater apparatus model number, manufacturer information, and position (GPS) information.

The user information 2101 includes at least one of a user ID (for example, SIM card ID), a telephone number, and a mail address.

The application information 2102 includes an application and version information thereof (application version information). The application is for transmitting a command to the main controller 209 so as to activate the near-field communication unit 204 when the repeater apparatus 20 performs the near-field communication with the terminal 10, and processing data when the repeater apparatus 20 makes communication with the server 30.

The network communication unit 211 is a processing unit for making communication with the server 30 through the general-purpose network 40 such as the Internet or mobile phone network, and employed for transmission and reception of predetermined data.

The repeater apparatus 20 thus configured according to the embodiment 1 offers the following advantages. For example, when the user wishes to make customer registration with respect to the terminal 10, the user brings the repeater apparatus 20 closely opposite the terminal 10. Then the repeater apparatus 20 automatically acquires the information of the terminal 10 and transmits the acquired information to the designated server 30. In response, the repeater apparatus 20 receives notification to the effect that the registration is completed from the server 30, and displays the notification on the display unit 202. Thus, the user can confirm that the customer registration has been completed.

As another example, when the user wishes to add a function to the terminal 10, the user transmits information of the desired function to the server 30 from the repeater apparatus 20. In response, the repeater apparatus 20 acquires the function information from the server 30. To transfer the acquired function information to the terminal 10, the user brings the repeater apparatus 20 closely opposite the terminal 10, so that the communication control unit 206 acquires the information for identifying the terminal 10 through the antenna 201. In addition, the comparison unit 208 compares the identification information acquired from the terminal 10 with the information of the corresponding terminal acquired from the server 30 together with the function information. In the case where these pieces of information agree with each other, the communication control unit 206 transfers the function information to the terminal 10. In the case, on the contrary, where those pieces of information do not agree, the repeater apparatus 20 does not transfer the function information to the terminal 10 but outputs a display on the display unit 202 for notifying the user to this effect. As described above, before the function information of the terminal 10 is updated, it is confirmed whether the function information to be transferred to the terminal 10 corresponds to that terminal 10, and the function is installed only when the terminal 10 is the correct one. Such an arrangement prevents the information from being transmitted to a wrong terminal apparatus, thereby automatically preventing malfunction of the terminal apparatus.

The server 30 according to the embodiment 1 will now be described in details, referring to the drawings.

Figure 10:
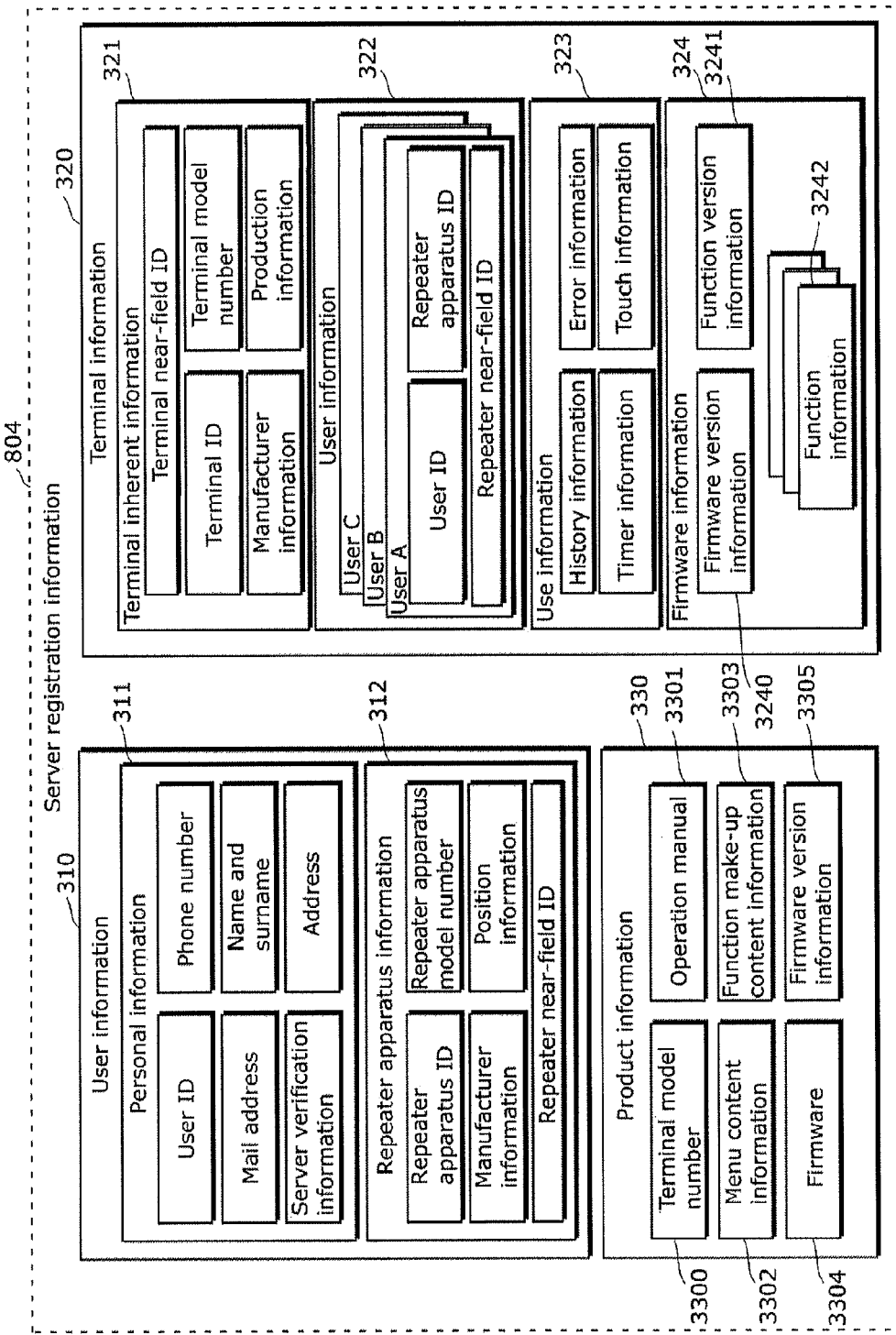
FIG. 10 is a schematic drawing showing a configuration of server registration information according to the embodiment 1.

FIG. 10 is a schematic drawing showing a configuration of server registration information 804 registered in the server 30 according to the embodiment 1.

As shown in FIG. 10, user information 310, terminal information 320, and product information 330 are registered in the server 30.

The user information 310 includes personal information 311 about the user of the repeater apparatus 20 and repeater apparatus information 312 about the repeater apparatus 20.

The personal information 311 includes a user ID, a telephone number, a mail address, and server verification information. The repeater apparatus information 312 includes a repeater apparatus ID, a repeater apparatus model number, manufacturer information, position information, and a repeater near-field ID. The aforementioned pieces of information are transmitted from the repeater apparatus 20 through the network 40. Here, the name and address of the user registered from the exclusive website of the manufacturer may be registered in combination, though the detail of such procedure is not described herein.

The terminal information 320 includes terminal inherent information 321, user information 322, use information 323, and firmware information 324. The terminal inherent information 321 is a specific example of the first terminal identification information 302 shown in FIG. 1. The terminal inherent information 321 includes a terminal near-field ID, a terminal ID, a terminal model number, manufacturer information, and production information. The user information 322 includes a user ID, a repeater apparatus ID, and a repeater near-field ID. The use information 323 includes history information of the terminal 10, error information, timer information, and touch information. The firmware information 324 includes firmware version information 3240, function version information 3241, and function information 3242. The aforementioned pieces of information are also transmitted from the repeater apparatus 20 through the network 40. In addition, the function information 3242 is a specific example of the control information 301 shown in FIG. 1.

The user information 322 may include information of a plurality of different users. In this case, different users can share the firmware information 324. Likewise, the function information 3242 may include information of a plurality of different functions. By making up a plurality of pieces of function information 3242 in advance, the user can utilize the function information 3242 appropriate for each of different use conditions, without the need to remake the function information 3242 each time the use condition changes.

The product information 330 includes a terminal model number 3300, an operation manual 3301, applicable menu content information 3302, function make-up content information 3303, a firmware 3304, and firmware version information 3305.

By containing the foregoing types of information, the server 30 according to the embodiment 1 offers the following advantages. For example, when the user of the repeater apparatus 20 wishes to download the function information 3242 made up for the terminal 10, the repeater apparatus information 2100, the user information 2101, the terminal information 2071, and a command to download the function information are transmitted from the repeater apparatus 20 to the server 30. In response, the server 30 looks up for example the user ID registered in the user information 310 and the user ID registered in the user information 322, and transmits the function information 3242 to the repeater apparatus 20 in the case where the function information 3242 corresponding to the user is present. In the case where the corresponding function information 3242 is not present or the transmitted user ID is not identified as the user of the terminal 10, in other words in the case where the user information of the repeater apparatus 20 fails to be associated with the terminal 10, the firmware made up by the user is not transmitted. Managing thus the user information 310 and the terminal information 320 as a database in the server 30 allows requested information to be transmitted only to an authorized (registered) user.

Hereunder, an operation flow of the communication system 1 according to the embodiment 1 will be described. First, an outline of the operation will be described.

The user registers the control information 301 associated with the first terminal identification information 302 in the server 30, by using the repeater apparatus 20.

Then the first near-field communication (touch) is performed between the repeater apparatus 20 and the terminal 10. At this point, the near-field communication unit 204 acquires the second terminal identification information 303 from the terminal 10.

The network communication unit 211 of the repeater apparatus 20 then acquires, from the server 30, the control information 301 corresponding to the second terminal identification information 303 acquired at the first near-field communication, as shown in FIG. 2 (S101).

The near-field communication unit 204 of the repeater apparatus 20 again acquires the second terminal identification information 303 at the second near-field communication (touch) with the terminal 10 (S102).

Then the comparison unit 208 decides whether the first terminal identification information 302 and the second terminal identification information 303 acquired at the second near-field communication agree with each other (S103).

The near-field communication unit 204 transmits the control information 301 to the terminal 10, in the case where the first terminal identification information 302 and the second terminal identification information 303 agree with each other (S104).

Each of the foregoing operations will now be described in further details.

First, description will be made on a process in which the user makes up the function information for the terminal 10 using the repeater apparatus 20 so as to utilize the terminal 10 in a desired manner, and registers the function information made up in the server 30. In the following description, the owner (primary user) of the repeater apparatus 20 will be referred to as user A.

Figure 11:
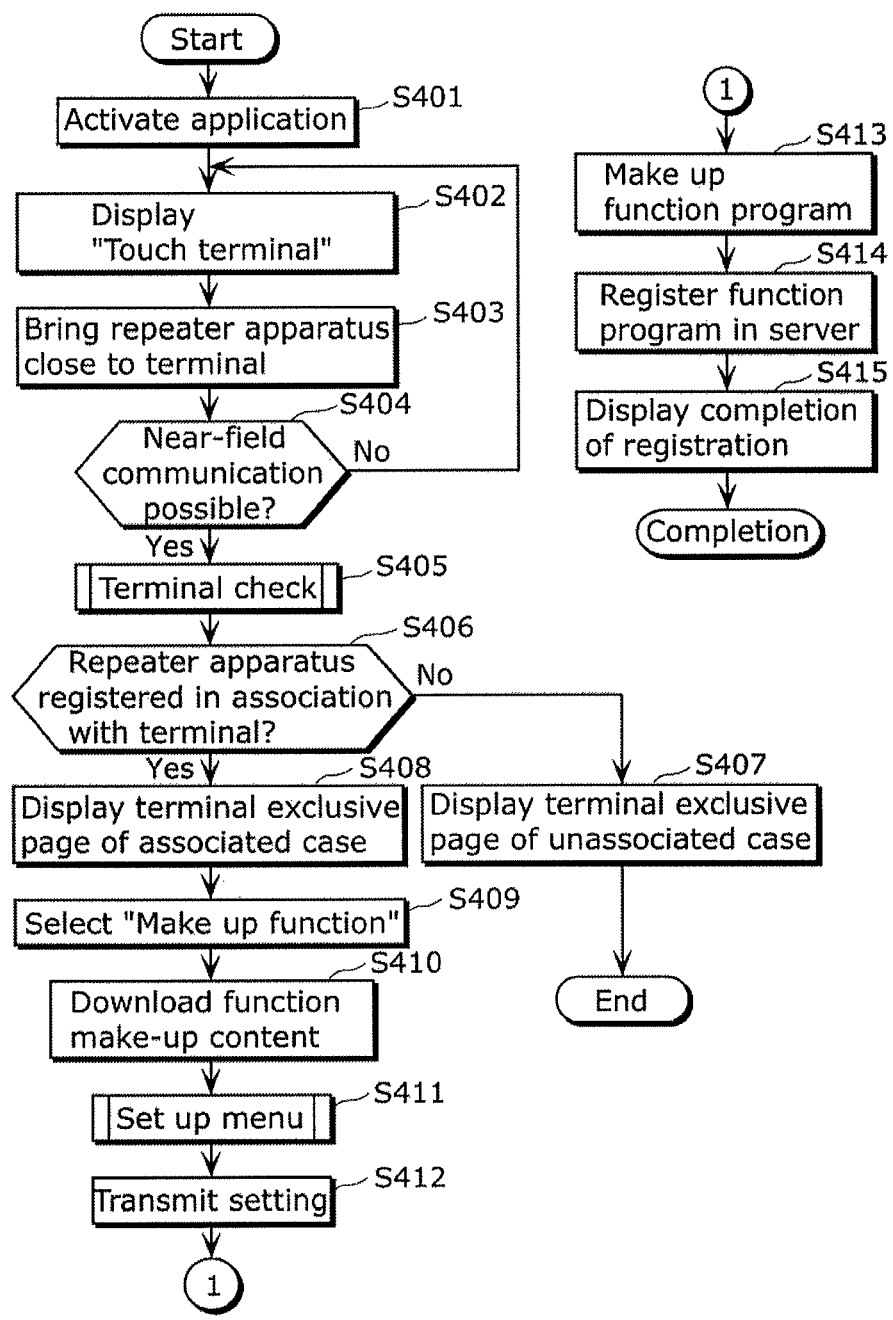
FIG. 11 is a flowchart showing a process of registering function information in a server, according to the embodiment 1.

FIG. 11 is a flowchart showing a process of registering the function information in the server 30, according to the embodiment 1. In FIG. 11, the process specified in steps S401 to S412 is performed primarily on the side of the repeater apparatus 20, and the process specified in steps S413 to S415 is performed primarily on the side of the server 30.

First, the user activates an exclusive application installed in advance in the repeater apparatus 20 (S401).

Once the application is activated, a message urging the user to bring the repeater apparatus 20 closely opposite (into touch with) the terminal 10 is displayed on the display unit 202 of the repeater apparatus 20 (S402).

The user brings the repeater apparatus 20 closely opposite the terminal 10, in accordance with the display (S403). Here, the expression "bring closely opposite" refers to bringing the repeater apparatus 20 sufficiently close to the terminal 10 such that the near-field communication unit 103 of the terminal 10 and the near-field communication unit 204 of the repeater apparatus 20 are located within the communicable range.

When the user brings the repeater apparatus 20 closely opposite the terminal 10, the repeater apparatus 20 checks whether it is possible to make communication with the terminal 10 (S404). In other words, the repeater apparatus 20 checks whether the repeater apparatus 20 and the terminal 10 are located within the communicable range. In the case where it is decided that the communication is possible (Yes at S404), the repeater apparatus 20 performs terminal check (S405). In the case where it is decided that the communication is not possible (No at S404), the repeater apparatus 20 again displays the message urging the user to bring the repeater apparatus 20 closely opposite the terminal 10, on the display unit 202 (S402).

Here, a process of the terminal check (S405) will be described.

Figure 12:
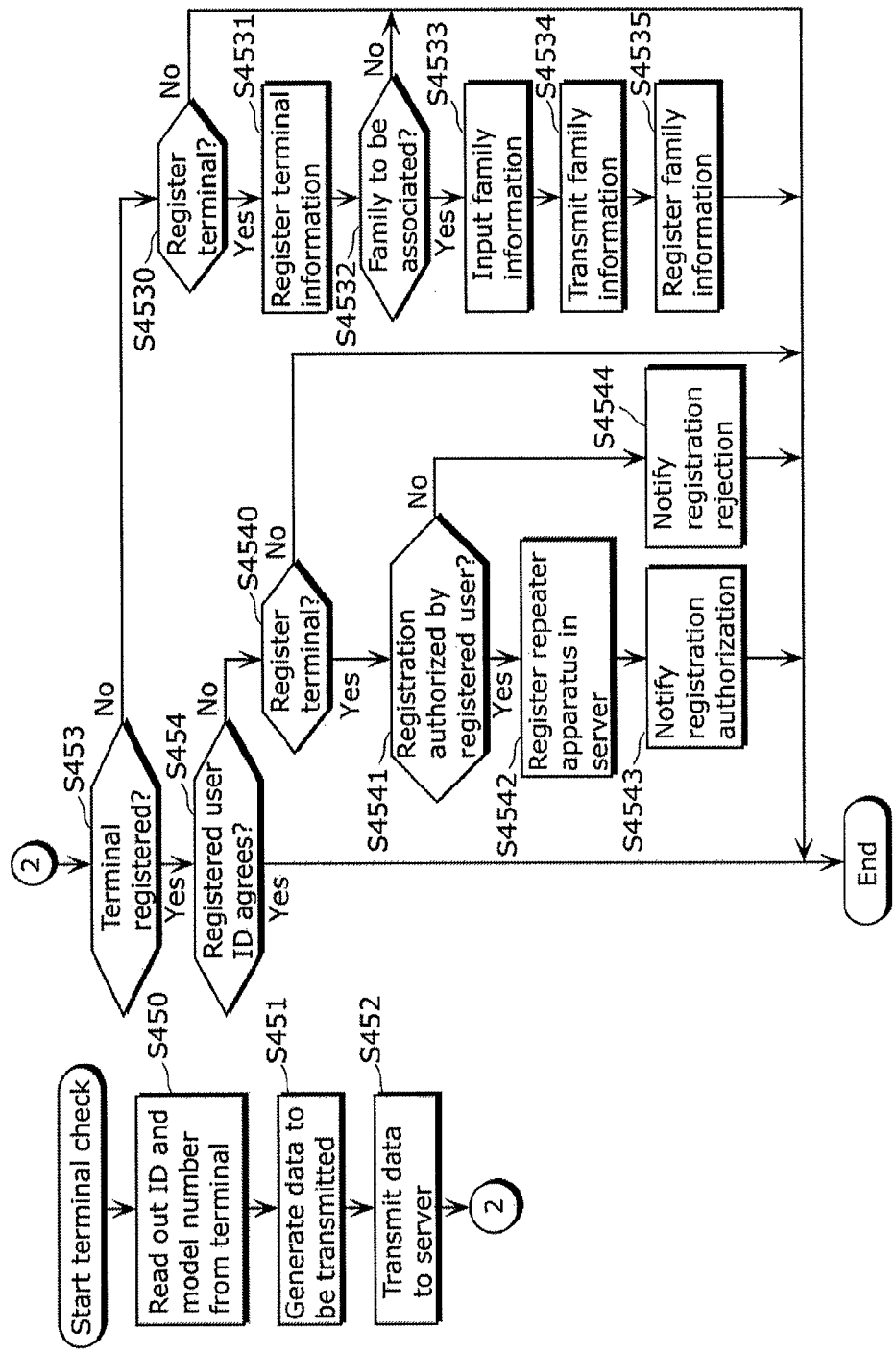
FIG. 12 is a flowchart showing a terminal check process according to the embodiment 1.

FIG. 12 is a flowchart showing the terminal check process according to the embodiment 1. In FIG. 12, the process specified in steps S450 to S452 is performed primarily on the side of the repeater apparatus 20, and the process specified in steps subsequent to S453 is performed primarily on the side of the server 30.

First, the repeater apparatus 20 reads out the terminal near-field ID 10330, the terminal inherent information 10331, and the server access information 10332 from the terminal 10 through the near-field communication unit 204, and stores such information in the near-field communication memory 207 as terminal information 2071 (S450). The repeater apparatus 20 generates data to be transmitted including the information about the terminal read out as above, and the repeater apparatus information 2100 and the user information 2101 stored in the main memory 210 (S451). The repeater apparatus 20 then transmits the generated data to the server 30, at the URL recorded in the server access information 2075 (S452).

Upon receipt of the data transmitted from the repeater apparatus 20, the server 30 checks whether the received information about the terminal 10 is registered on the database contained in the server 30 (S453). Such checking may be performed, for example, on the basis of the terminal near-field ID 2073 registered on the database. Alternatively, the server 30 may utilize information that allows unique identification of the terminal, such as the terminal ID recorded in the terminal inherent information 2074.

In the case where the received information is not registered on the database as a result of the above checking (No at S453), it is decided that the relevant terminal 10 is not registered on the database (customer registration has not been made). Then the server 30 transmits to the repeater apparatus 20 a message urging the user A to decide whether the terminal near-field ID 2073, the terminal inherent information 2074, the repeater apparatus information 2100, and the user information 2101 received as above may be newly registered on the database (S4530). The repeater apparatus 20 displays the received message on the display unit 202. In the case where the user A selects "register terminal 10" (Yes at S4530), the repeater apparatus 20 transmits such decision to the server 30. Upon receipt of the decision, the server 30 registers the foregoing information of the terminal 10 (S4531).

Further, the server 30 transmits a message asking whether family information of the user A may be registered on the database, to the repeater apparatus 20 (S4532). In the case where the user A selects "register family information" (Yes at S4532), the user A further inputs information of the family member(s) to be registered (S4533). The information of the family member(s) to be registered includes, for example, the user information 2101 of the repeater apparatus 20 owned by the family member(s), and the server verification information of the family member(s). When the user A inputs the information of the family member(s), the repeater apparatus 20 again transmits such information to the server 30 through the network communication unit 211 (S4534). The server 30 registers the received family information in association with the terminal 10 (S4535), and finishes the terminal check process. Registering thus the family member(s) on the database as the user of the terminal 10 allows all the family members registered as the user of the terminal 10 to share the information about the terminal 10. In contrast, in the case where the user A selects "not register terminal 10" (No at S4530), or the user A registered as the user of the terminal selects "not register family information" (No at S4532), the terminal check process is finished.

Although the foregoing description refers to the registration of the family information (steps S4532 to S4535), naturally this registration may be skipped. In this case, the terminal check process is finished upon completing the step S4531.

In the case where the received information is registered on the database (Yes at S453), the server 30 checks whether the user ID recorded in the user information 2101 of the repeater apparatus 20 agrees with the content of the user information 322 of the terminal 10 (S454). Here, instead of the user ID, the server 30 may utilize information that allows unique identification of the user A, such as the repeater near-field ID 2070 of the repeater apparatus 20 owned by the user A.

In the case where the registered user identification information of the terminal 10 agrees with the content of the user information 2101 (Yes at S454), it means that the user A has been registered as the user of the terminal 10, and therefore the terminal check process is finished. In the case where the registered user identification information of the terminal 10 does not agree with the content of the user information 2101 (No at S454), it means that the terminal 10 is registered in the server 30 by a user other than the user A. Accordingly, the server 30 transmits to the repeater apparatus 20 a message asking whether the terminal 10 may be registered, so that the user A makes a decision (S4540).

In the case where the user A selects "not register terminal" (No at S4540), the customer registration for the terminal 10 is not performed and the terminal check process is finished. In the case where the user A selects "register terminal" (Yes at S4540), the repeater apparatus 20 transmits such decision to the server 30. Upon receipt of the decision, the server 30 requests the user already registered as the user of the terminal 10 to decide whether the user A may be registered as the user of the terminal 10 (S4541). In the case where the registered user of the terminal 10 authorizes the registration (Yes at S4541), the server 30 registers the user A as the user of the terminal 10 (S4542) and notifies the user A that the registration has been made (S4543), and then finishes the terminal check process. On the contrary, in the case where the registered user of the terminal 10 rejects the registration of the user A (No at S4541), the server 30 notifies the user A that the registration has been rejected (S4543), and finishes the terminal check process.

It is to be noted that the foregoing terminal check process is only exemplary, and that a different process may be performed as long as it can be confirmed whether the repeater apparatus 20 is registered in the server 30 in association with the terminal 10.

Referring again to FIG. 11, upon completing the terminal check process (S405) the server 30 transmits a terminal 10 exclusive page based on the result of the terminal check to the repeater apparatus 20 (S406).

More specifically, in the case where the repeater apparatus 20 is not registered in the server 30 in association with the terminal 10 (No at S406), the server 30 transmits the terminal 10 exclusive page prepared for such a case, to the repeater apparatus 20 (S407).

Figure 13:
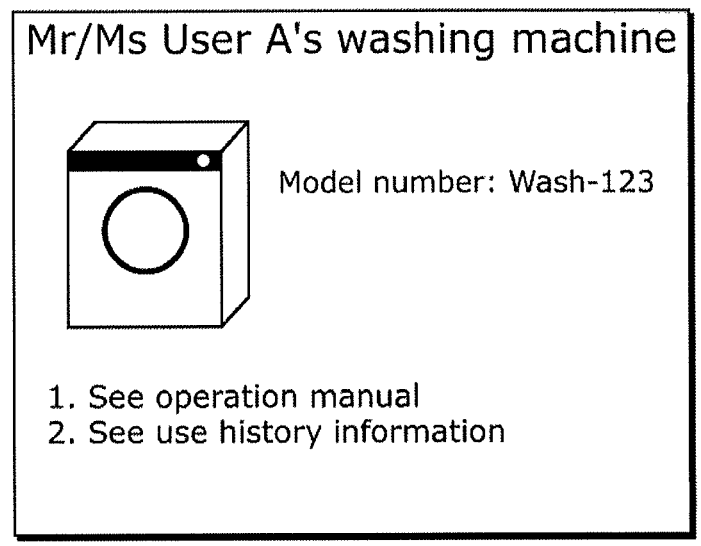
FIG. 13 is a schematic drawing showing an example of display content according to the embodiment 1.

FIG. 13 is a schematic drawing showing an example of the terminal 10 exclusive page prepared for the case where the repeater apparatus 20 is not registered in association with the terminal 10, according to the embodiment 1. In FIG. 13, the terminal 10 is exemplified by a washing machine. When the user selects "1. See operation manual", the server 30 extracts the operation manual 3301 from the registered information and transmits the operation manual 3301 to the repeater apparatus 20. When the user selects "2. See use history information", the server 30 transmits content generated on the basis of the history information included in the use information 323, for example a graphic expression of the history information, to the repeater apparatus 20. Thus, the operation according to each menu is performed, however in the case where the repeater apparatus 20 is not registered in the server 30 in association with the terminal 10 it is not possible to make up the function information, and therefore the process is finished at this point.

In contrast, in the case where the repeater apparatus 20 is registered in the server 30 in association with the terminal 10 (Yes at S406), server 30 transmits the terminal 10 exclusive page prepared for such a case, to the repeater apparatus 20 (S408).

Figure 14:
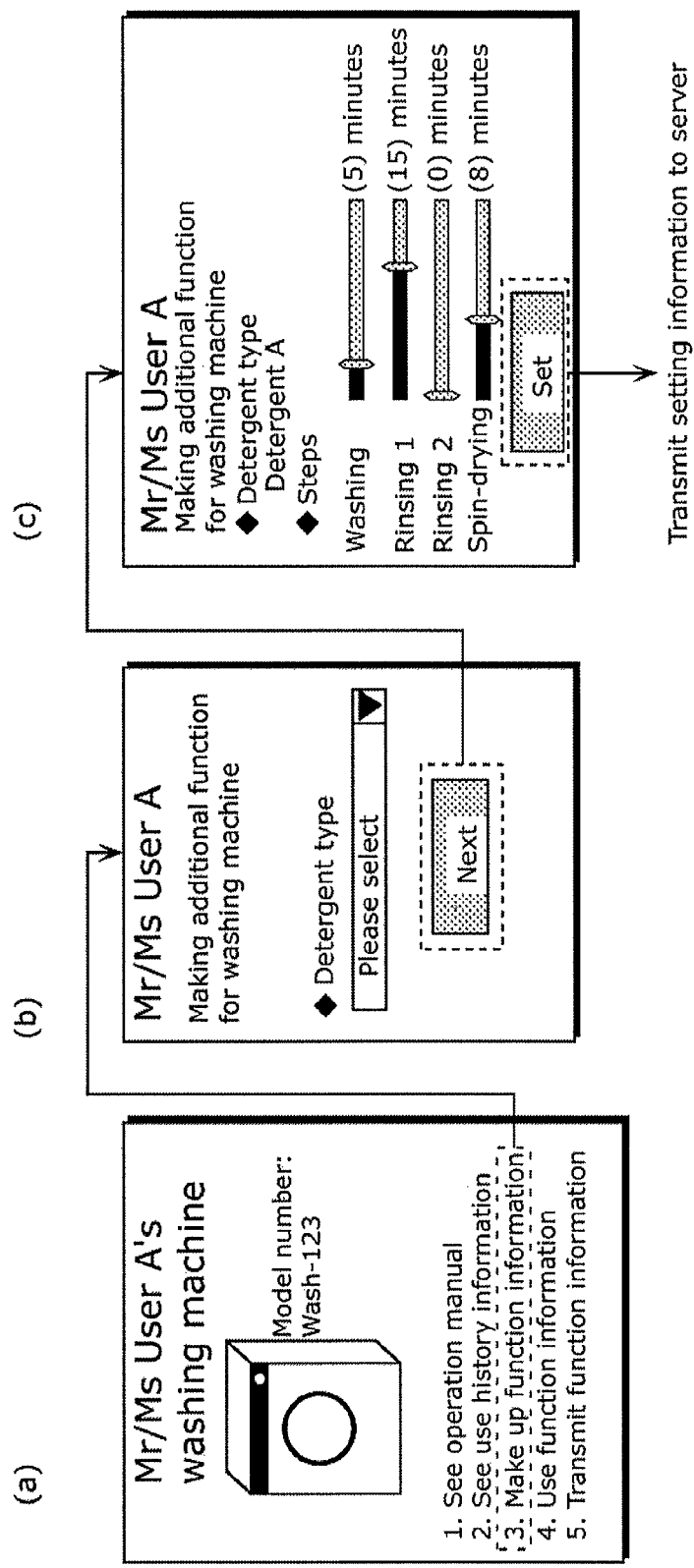
FIG. 14 is a schematic drawing showing another example of the display content according to the embodiment 1.

FIG. 14(a) is a schematic drawing showing an example of the terminal 10 exclusive page prepared for the case where the repeater apparatus 20 is registered in association with the terminal 10, according to the embodiment 1. It is assumed here that the user A selects "3. Make up function information" (S409). The server 30 transmits the function make-up content information 3303 to the repeater apparatus 20 (S410). FIGS. 14(b) and 14(c) depict examples of the content of the function make-up content information 3303 to be transmitted. In the case of the washing machine for example, the user A may select "type of detergent" to make up the function information, as shown in FIG. 14(b). Following such selection, the user A may set the duration of the washing steps such as "washing", "rinsing", and "spin-drying" as desired, as shown in FIG. 14(c) (S411). When such settings are done, the repeater apparatus 20 transmits the setting information to the server 30 (S412).

Upon receipt of the function setting information made up by the user A and transmitted from the repeater apparatus 20, the server 30 generates a program that can be installed in the terminal 10, on the basis of the received information (S413). The server 30 registers the program thus generated as the function information 3242 (S414), and transmits an instruction to display the completion of the registration to the repeater apparatus 20 to thereby notify the user A that the registration has been completed (S415), and finishes the process.

As described above, in the embodiment 1 of the present invention the server 30 confirms whether the terminal 10 and the user A (repeater apparatus 20) are associated with each other, when the user A wishes to make up the function information 3242 applicable to the terminal 10 through the interface of the repeater apparatus 20. Then the function make-up content information 3303 is transmitted to the user A only when the user A is associated with the terminal 10. Only in this case, the user A can make up the function information 3242 and register the same in the server 30. Therefore, it is only the user registered in advance as the user of the terminal 10 who can make up the function information 3242 for the terminal 10 and register such information in the server 30. Such an arrangement prevents a malicious operation such as making or registering unauthorized function information, and thus improves the security level.

Hereafter, description will be made on a process in which the user downloads the function information registered in the server 30 by using the repeater apparatus 20 to utilize the function information, and installs the function information in the terminal 10. In the following description, the user of the repeater apparatus 20 will be referred to as user A, as in the foregoing description.

Figure 15:
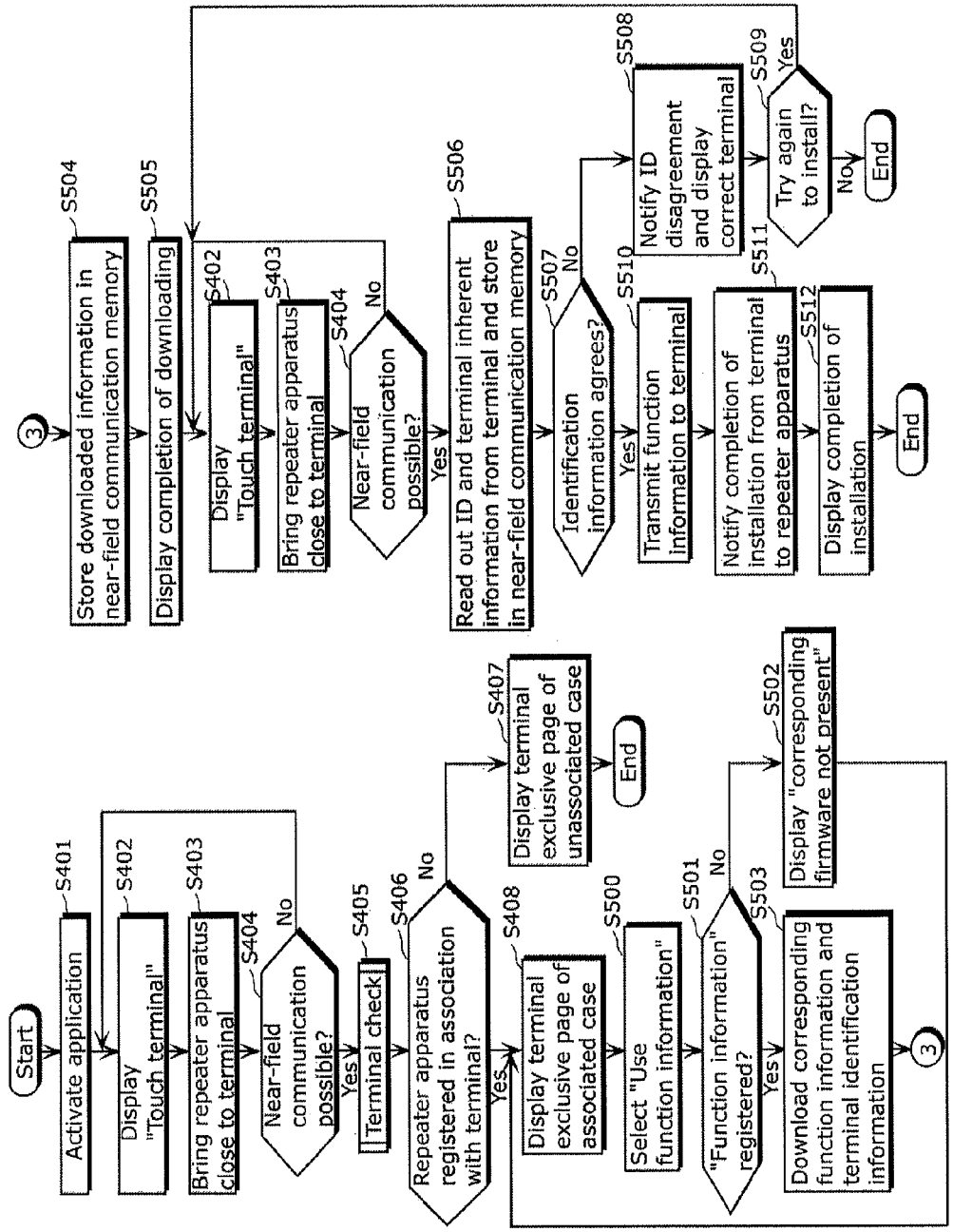
FIG. 15 is a flowchart showing a process of installing function information in the terminal, according to the embodiment 1.

FIG. 15 is a flowchart showing a process in which the user installs the function information 3242 registered in the server 30 in the terminal 10. In FIG. 15, the same steps as those of FIG. 11 will be given the same numeral and the description thereof will not be repeated.

Upon completing the terminal check process (S405), the server 30 transmits the terminal 10 exclusive page according to the result of the terminal check, to the repeater apparatus 20 (S406).

In the case where the repeater apparatus 20 is registered in the server 30 in association with the terminal 10 (Yes at S406), the server 30 transmits the terminal 10 exclusive page prepared for such a case, to the repeater apparatus 20 (S408). In this case, for example the content as shown in FIG. 14(a) is transmitted.

It is assumed here that the user A selects "4. Use function information" (S500). Upon receipt of the selection of the user A, the server 30 checks whether the function information 3242 for the terminal 10 is registered (S501). Here, the function information 3242 for the terminal 10 includes not only the function information 3242 registered by the user A, but also the function information 3242 registered by the user registered as the user of the terminal 10, for example the family member(s) of the user A. In the case where registered function information 3242 is not present (No at S501), the server 30 notifies the repeater apparatus 20 to the effect that the function information 3242 is not registered. The repeater apparatus 20 displays such notification on the display unit 202, to thereby notify the user A that the function information 3242 is not registered (S502). Then the repeater apparatus 20 again displays the terminal 10 exclusive page prepared for the case where the repeater apparatus 20 is registered in association with the terminal 10 (S408).

In contrast, in the case where the function information 3242 is registered (Yes at S501), the server 30 transmits the relevant function information 3242, the function version information 3241, and the terminal inherent information 321, to the repeater apparatus 20 (S503). Upon receipt of the mentioned information, the repeater apparatus 20 stores such information in the near-field communication memory 207 as the download information 2072 (S504). Then the repeater apparatus 20 displays that the downloading is completed on the display unit 202 (S505), to thereby notify the user A to that effect.

In order to install the function information 3242 downloaded as above in the repeater apparatus 20, the repeater apparatus 20 displays a message urging the user A to bring the repeater apparatus 20 closely opposite the terminal 10, on the display unit 202 (S402). In view of this, the user A brings the repeater apparatus 20 closely opposite the terminal 10 (S403). Once the user does so, the repeater apparatus 20 checks whether it is possible to make communication with the terminal 10 (S404). If it is decided that the communication is not yet possible (No at S404), the repeater apparatus 20 again displays the message urging the user A to bring the repeater apparatus 20 closely opposite the terminal 10, on the display unit 202 (S402).

In the case where it is decided that the communication can be made (Yes at S404), the repeater apparatus 20 reads out the terminal near-field ID 10330 and the terminal inherent information 10331 from the terminal 10, through the near-field communication unit 204. The repeater apparatus 20 then stores the information thus read out in the near-field communication memory 207 as the terminal information 2071 (S506).

Thereafter, the comparison unit 208 compares the terminal near-field ID 2073 read out from the terminal 10 with the terminal near-field ID 2077 downloaded from the server 30, to check whether these IDs agree with each other (S507).

In the case where the two IDs do not agree as a result of the comparison (No at S507), a warning is displayed on the display unit 202. This represents the case where the terminal 10 to which the repeater apparatus 20 was brought close to display the terminal 10 exclusive page is different from the terminal 10 to which the repeater apparatus 20 was brought close to install the function information. To be more detailed, the repeater apparatus 20 displays a message to the effect that the function information cannot be installed because the two IDs do not agree, and information of the correct terminal 10 corresponding to the function information (S508). Further, the repeater apparatus 20 displays a message asking the user A whether the function information is still to be installed, on the display unit 202 (S509). In the case where the user A still wishes to install the function information (Yes at S509), the repeater apparatus 20 again displays the message urging the user A to bring the repeater apparatus 20 closely opposite the terminal 10, on the display unit 202 (S402). If the user A decides not to install the function information (No at S509), the repeater apparatus 20 finishes the process.

In the case where the comparison unit 208 decides that the terminal near-field ID 2073 read out from the terminal 10 and the terminal near-field ID 2077 downloaded from the server 30 agree with each other (Yes at S507), the repeater apparatus 20 transmits the function information and the function version information stored as the firmware information 2079, to the terminal 10 through the near-field communication unit 204 (S510).

As stated above, in order to install the function information and the function version information downloaded from the server 30 in the terminal 10, the user A brings the repeater apparatus 20 closely opposite the terminal 10 to thereby establish the near-field communication. Once the near-field communication is established, the series of operations including reading out the terminal inherent information of the terminal 10, comparison of the identification information, transmission of the function information to the terminal 10, and displaying the completion of the installation are performed after the communication is established and before the communication is disconnected. For example, in the case where the terminal 10 and the repeater apparatus 20 perform the near-field communication therebetween, the near-field communication unit 103 of the terminal 10 and the near-field communication unit 204 of the repeater apparatus 20 are once brought into the communicable range, so that the near-field communication is established. After the near-field communication is established, the foregoing series of operations are performed before the near-field communication unit 103 of the terminal 10 and the near-field communication unit 204 of the repeater apparatus 20 are separated from each other beyond the communicable range. In other words, the series of operations are performed by a single touch between the repeater apparatus 20 and the terminal 10.

The terminal 10 once stores the function information and the function version information received as above in the near-field communication memory 1033, after which the terminal 10 transmits such information to the main memory 102 and notifies the repeater apparatus 20 that the installation has been completed (S511). Upon receipt of the notification of the completion of installation, the repeater apparatus 20 displays to that effect on the display unit 202 (S512) for notification to the user A, and finishes the process.

By employing the foregoing process, the user can add the function information to the terminal 10 with the repeater apparatus 20 having the near-field communication function which is inexpensive and intuitively operable, even when the terminal 10 is not compatible with a general-purpose network such as the Internet. Accordingly, an optimum setting that fits each user's desire can be implemented in the terminal 10. In addition, all the users registered as the user of the terminal 10 can easily download the function information registered for the terminal 10. Therefore, for example, in the case where all the family members who may use the terminal 10 are registered as users, and the primary user of the terminal 10 makes up the function information suitable for the family and registers such function information, the function information can be shared among all the family members. Further, when the downloaded function information is to be installed in the terminal 10, the comparison unit 208 of the repeater apparatus 20 checks whether the terminal near-field ID 2077 downloaded together with the function information and the terminal near-field ID 2073 read out from the terminal 10 agree with each other. Such an arrangement prevents the function information from being installed in a wrong terminal apparatus, thereby preventing malfunction of the terminal apparatus.

Although the embodiment 1 of the present invention exemplifies the case where the user activates the application, a different arrangement may be adopted. For example, the application may be triggered by bringing the repeater apparatus 20 closely opposite the terminal 10, without an express instruction of the user to activate the application. Alternatively, for example, the repeater apparatus 20 may perform operations that would be performed by the application, such as acquiring information from the terminal 10 or transmission of information to the server 30.

According to the embodiment 1, the comparison unit 208 is set to compare the terminal near-field ID 2073 read out from the terminal 10 at the step S506 and the terminal near-field ID 2077 downloaded from the server 30. However, the comparison unit 208 may employ different information for the comparison, provided that the information allows the terminal 10 to be uniquely identified. For example, the comparison unit 208 may compare the terminal inherent information 2074 read out from the terminal 10 with the terminal identification information contained in the terminal inherent information 2078 downloaded from the server 30.

Figure 16:
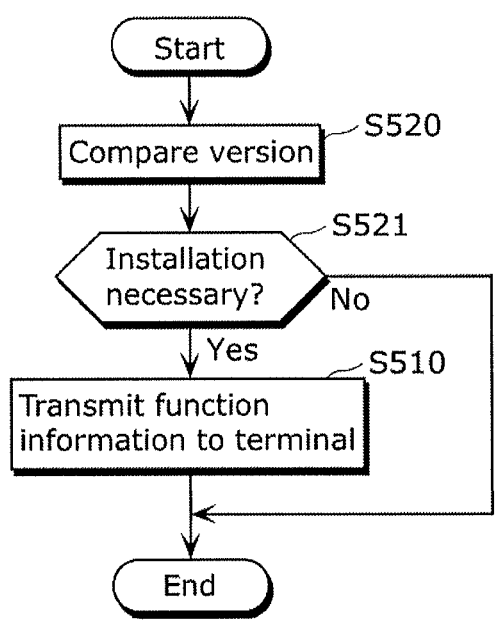
FIG. 16 is a flowchart showing a version decision process according to the embodiment 1.

Further, the comparison unit 208 may compare the version information of the function information to be installed, to thereby decide whether the function information may be installed. FIG. 16 is a flowchart showing the operation performed by the repeater apparatus 20 in such a case. Here, FIG. 16 shows the process that follows "Yes" at the step S507.

First, the network communication unit 211 acquires first version information (function version information 3241) from the server 30 together with the function information 3242. The first version information indicates the version of the function information 3242 to be installed.

Then the near-field communication unit 204 acquires, by near-field communication from the terminal 10 to communicate with, the second version information (function version information 1028) stored therein. The second version information indicates the version of the function information already installed in the terminal 10.

Then the comparison unit 208 decides whether the version indicated by the first version information and the version indicated by the second version information agree with each other (S520).

The near-field communication unit 204 transmits the function information to the terminal 10 by near-field communication, in the case where the comparison unit 208 decides that the first terminal identification information and the second terminal identification information agree with each other (Yes at S507), and that the version indicated by the first version information and the version indicated by the second version information do not agree with each other (Yes at S521) (S510). Upon receipt of the function information, the terminal 10 installs therein the function information.

In addition, the near-field communication unit 204 does not transmit the function information to the terminal 10 if the version indicated by the first version information and the version indicated by the second version information agree with each other (No at S521), even though it is decided that the first terminal identification information and the second terminal identification information agree with each other (Yes at S507). Accordingly, the terminal 10 does not receive the function information, nor install the same.

Alternatively, the function version information may contain time information indicating the time at which the function information was generated, and the repeater apparatus 20 may compare the time information at the step S520 to thereby decide whether the function information may be installed (S521). More specifically, the repeater apparatus 20 may decide not to install the function information in the case where the time at which the function information to be installed was generated is the same as the time at which the function information already installed in the terminal 10 was generated (No at S521).

Further, after identifying the terminal 10 with information that allows the terminal 10 to be uniquely identified, the comparison unit 208 may likewise compare the firmware version information stored in the near-field communication memory 207. In this case, the comparison unit 208 can compare the version of the firmware installed in the terminal 10 and the version of the firmware made by the manufacturer. In the case where the version information of the firmware made by the manufacturer is newer, the repeater apparatus 20 may newly download the firmware 3304 and install the firmware 3304 in the terminal 10. Such an arrangement enables the terminal 10 to be maintained in the latest state intended by the manufacturer of the terminal 10.

According to the embodiment 1, the foregoing process is finished when the function information is installed in the terminal 10 and the repeater apparatus 20 displays the completion of the installation. In the case where the function information specifies that the terminal 10 is to be activated once the function information is installed, naturally the terminal 10 is activated accordingly. In addition, in the case where the terminal 10 contains already installed function information when the repeater apparatus 20 is first brought closely opposite the terminal 10, the repeater apparatus 20 may display a new option of "Use function information of XXX" on the basis of the version information of the function information, though not illustrated in FIG. 14(a). When the user A selects that option, the repeater apparatus 20 displays a message urging the user A to bring the repeater apparatus 20 closely opposite the terminal 10. Then the already installed function information may be activated once the repeater apparatus 20 is thus brought closely opposite the terminal 10. Such an arrangement enables the user A to easily utilize the function information installed in the terminal 10, without the need to download the function information from the server each time the user A wishes to utilize the same. Further, the user A can save information expense incurred from exchanges of information with the server 30.

Although the comparison unit 208 compares, according to the embodiment 1, the terminal inherent information received from the server 30 and the terminal inherent information received from the terminal 10, for example a digital signature may be added to the received function information for preventing falsification. Alternatively, the comparison unit 208 may encrypt the function information and acquire key information or an inherent value stored in advance in the terminal 10. Otherwise, the comparison unit 208 may generate the key information or the inherent value on the basis of the terminal inherent information acquired from the terminal 10, and verify the digital signature or decrypt the function information, utilizing the key information or the inherent value. Then the comparison unit 208 may certify that the terminal 10 corresponding to the function information is the target of the near-field communication in the case where security is confirmed through the foregoing process, and transmit the function information to that terminal 10. Such an arrangement improves the security level of the communication between the server 30 and the repeater apparatus 20. Naturally, the repeater apparatus 20 may receive the terminal inherent information to which the digital signature is added in advance or which is encrypted from the terminal 10, and verify the digital signature or decrypt the function information on the basis of the key information or inherent value contained in the function information received from the server 30, or on the basis of the key information or inherent value generated from the terminal inherent information, so as to confirm the security.

2. Embodiment 2

Hereafter, an embodiment 2 of the present invention will be described in details referring to the drawings. According to the embodiment 1, information such as the function information 3242 is transmitted between the repeater apparatus 20 and the server 30 without encryption or the like. In the embodiment 2, in contrast, it is checked whether information such as the function information 3242 is falsified through the network 40, which is the communication path between the repeater apparatus 20 and the server 30. The installation in the terminal 10 is performed after such checking.

In addition, in the embodiment 1 the repeater apparatus 20 is first brought closely opposite the terminal 10 in which the function information is to be installed, so as to download only the function information exclusive to the terminal 10 in the repeater apparatus 20. In the embodiment 2, however, the information of all the terminals with respect to which the function information is registered is downloaded, without limiting the terminal 10 in which the function information is to be installed.

More specifically, the network communication unit 211 acquires from the server 30 a plurality of pieces of control information 301, and a plurality of pieces of first terminal identification information 302 each associated with the corresponding one of the plurality of pieces of control information 301 and indicating the terminal to be controlled by the associated control information 301. Then the comparison unit 208 identifies the first terminal identification information 302 that agrees with the second terminal identification information 303 acquired from the terminal 10, out of the plurality of pieces of first terminal identification information 302. The near-field communication unit 204 transmits the control information 301 associated with the first terminal identification information 302 decided by the comparison unit 208 to agree with the second terminal identification information 303, to the terminal 10 by near-field communication.

Here, the communication system according to the embodiment 2 includes a repeater apparatus 22, in place of the repeater apparatus 20 of the communication system 1 according to the embodiment 1 shown in FIG. 3. Accordingly, a configuration of the repeater apparatus 22 will be described in details here below.

Figure 17:
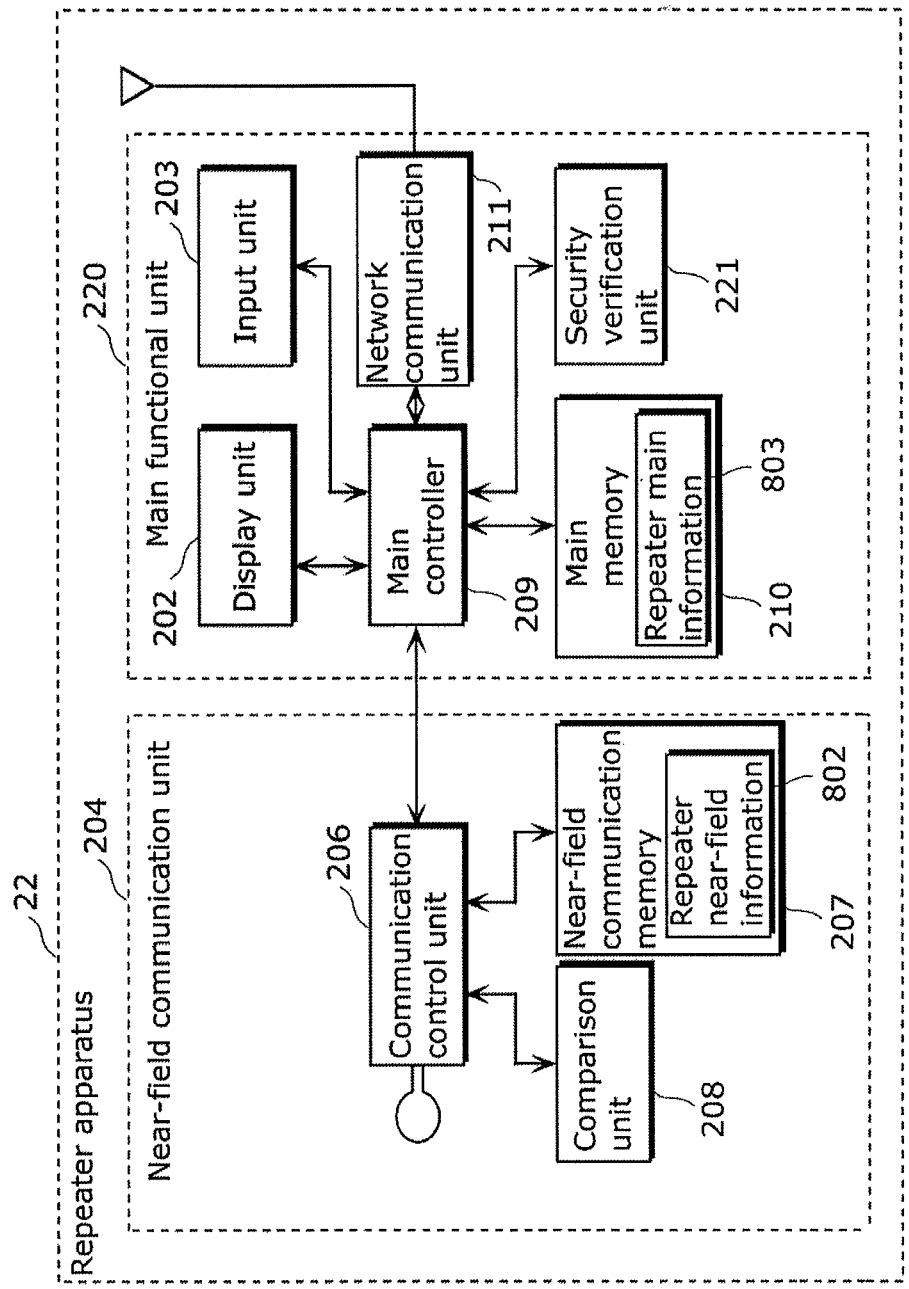
FIG. 17 is a block diagram showing a configuration of a repeater apparatus according to an embodiment 2 of the present invention.

FIG. 17 is a block diagram showing a configuration of the repeater apparatus 22 according to the embodiment 2. In FIG. 17, the same constituents as those of FIG. 7 are given the same numeral, and the description thereof will not be repeated.

As shown in FIG. 17, the repeater apparatus 22 includes a main functional unit 220, which is different from the main functional unit 205 shown in FIG. 7. More specifically, the main functional unit 220 further includes a security inspection unit 221 in addition to the configuration of the main functional unit 205.

The security verification unit 221 receives the information from the server 30 through the network communication unit 211, and checks whether the received information is falsified. For example, adding certification information such as a digital signature to the control information 301 transmitted from the server 30 enables the security verification unit 221 to decide whether the control information 301 has been falsified, on the basis of the certification information. In the case where the control information 301 is decided to have been falsified, the repeater apparatus 22 deletes such information and notifies the user that the control information 301 has been falsified, by displaying a message to this effect on the display unit 202. In contrast, in the case where it is decided that the control information 301 has not been falsified, the repeater apparatus 22 stores the received information in the near-field communication memory 207, through the main controller 209. Thus, the near-field communication unit 204 transmits the control information 301 to the terminal 10 by near-field communication, only when it is confirmed that the control information 301 has not been falsified.

With the foregoing configuration, it can be confirmed whether the information to be installed in the terminal 10 has been falsified by a malicious party. For example, in the case of installing the function information, if the received function information is falsified so as to embed a firing program or the like, a serious accident may be incurred. Accordingly, in the embodiment 2, the digital signature is employed to confirm whether the network 40 can be safely utilized.

Hereunder, description will be made on a process in which the user downloads the function information from the server 30 by using the repeater apparatus 22 to utilize the function information registered in the server 30, and installs the downloaded function information in the terminal 10. In the following description, the primary user of the repeater apparatus 22 will be referred to as user A, as in the description of the embodiment 1.

Figure 18:
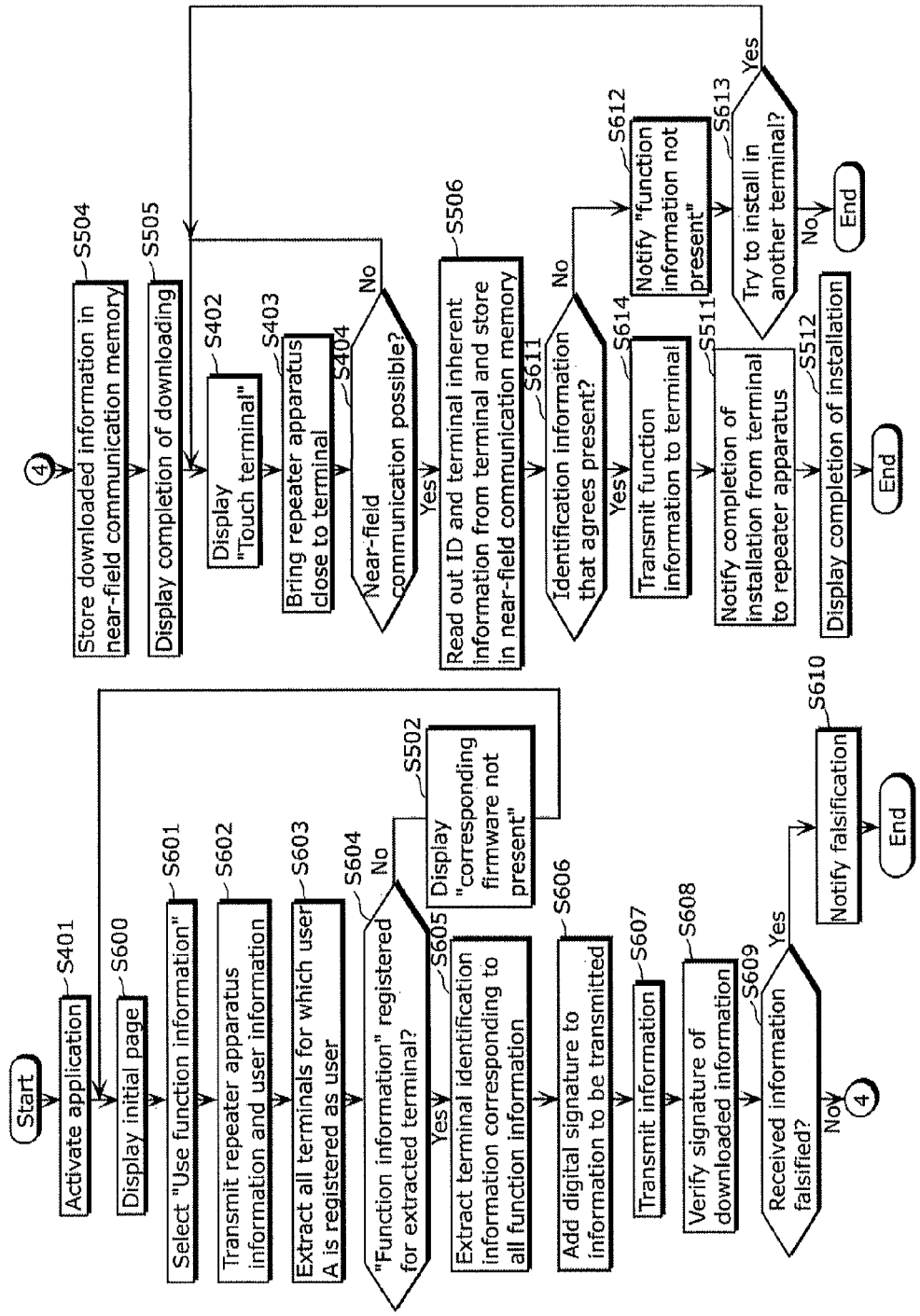
FIG. 18 is a flowchart showing a process of installing function information in a terminal, according to the embodiment 2.

FIG. 18 is a flowchart showing a process in which the user downloads the function information 3242 from the server 30 by using the repeater apparatus 22 to utilize the function information registered in the server 30, and installs the downloaded function information in the terminal 10. In FIG. 18, the same steps as those of FIG. 11 or FIG. 15 will be given the same numeral, and the description thereof will not be repeated.

First, the user A activates an exclusive application installed in advance in the repeater apparatus 22 (S401). Once activated, the application displays an initial page (S600).

FIG. 19 is a schematic drawing showing an example of the initial page displayed when the exclusive application installed in advance in the repeater apparatus 22 is activated. For the purpose of description, it is assumed that the user A selects "4. Use function information" (S601).

The user A selects "4. Use function information" out of the displayed initial page (S601).

In accordance with such selection, the repeater apparatus 22 transmits the repeater apparatus information 2100 and the user information 2101 to the server 30 (S602).

The server 30 extracts all the terminals with respect to which the user A is registered as the user, on the basis of the received information (S603). More specifically, the server 30 further extracts the registered function information 3242 with respect to all the extracted terminals, and switches the subsequent operation depending on the result (S604). In the case where the function information 3242 is not registered with respect to any of the terminals to be used by the user A (No at S604), the server 30 transmits a message to the effect that function information 3242 that can be downloaded is unavailable, to the repeater apparatus 22. Upon receipt of such a message, the repeater apparatus 22 displays the same message on the display unit 202 to thereby notify the user A that downloadable function information 3242 is unavailable (S502), and resets the display to the initial page (S600).

In contrast, in the case where the function information 3242 is registered for any of the plurality of terminals to be used by the user A (Yes at S604), the server 30 extracts all of such function information 3242 and information for identifying which function information is exclusive to which of the terminals, for example the terminal near-field ID (S605). The server 30 then adds the digital signature to all of the function information 3242 to be transmitted and all the terminal near-field IDs (S606). Upon adding the digital signature, the server 30 transmits the information to the repeater apparatus 22 (S607).

The security verification unit 221 of the repeater apparatus 22 inspects whether the received information has been falsified (S608). If the received information has been falsified (Yes at S609), the repeater apparatus 22 displays a message to the effect that the information has been falsified on the display unit 202 (S610) and finishes the process, because installing the information as it is may provoke malfunction of the terminal.

In the case where the received information is not falsified (No at S609), the repeater apparatus 22 stores the received information in the near-field communication memory 207 (S504). Then the repeater apparatus 22 notifies the user A that the downloading has been completed by displaying a message to this effect on the display unit 202, and displays a screen that urges the user A to bring the repeater apparatus 22 closely opposite the terminal (S402). The user A then brings the repeater apparatus 22 closely opposite the terminal 10 (S403). When the repeater apparatus 22 is located sufficiently close to the terminal 10 for the near-field communication (Yes at S404), the repeater apparatus 22 reads out the terminal near-field ID 10330 and the terminal inherent information 10331 from the terminal 10. The repeater apparatus 22 then stores the information read out as above in the near-field communication memory 207 (S506).

After the information is stored, the comparison unit 208 checks whether information that agrees with the terminal near-field ID 2073 read out from the terminal 10 is present among one or more terminal near-field IDs 2077 downloaded from the server 30 (S611).

In the case where information that agrees with the terminal near-field ID 2073 is not present among one or more terminal near-field IDs 2077 as a result of the checking (No at S611), in other words in the case where the function information 3242 exclusive to the terminal 10 close to which the user A has brought the repeater apparatus 22 is not registered in the server 30, the repeater apparatus 22 notifies the user A that the function information for that terminal 10 is not registered (S612). Then the repeater apparatus 22 displays on the display unit 202 a message asking whether the user A wishes to try to install the function information in another terminal (S613). In the case where the user A selects trying to install the function information in another terminal (Yes at S613), the repeater apparatus 22 again displays the message urging the user to bring the repeater apparatus 22 closely opposite the terminal (S402). In contrast, if the user A selects not trying to install the function information in another terminal (No at S613), the repeater apparatus 22 finishes the process. Here, naturally, the repeater apparatus 22 may reset the display to the initial page of the application (S600), instead of finishing the process.

In contrast, in the case where information that agrees with the terminal near-field ID 2073 is present among one or more terminal near-field IDs 2077 (Yes at S611), the repeater apparatus 22 transmits the function information 3242 corresponding to the terminal near-field ID 2077 that agrees (function information and function version information stored as the firmware information 2079), to the terminal 10 by near-field communication unit 204 (S614).

Then the terminal 10 once stores the function information and the function version information received as above in the near-field communication memory 1033, and then transmits the information thus stored to the main memory 102 and notifies the repeater apparatus 20 that the installation has been completed (S511). Upon receipt of the notification of the completion of installation, the repeater apparatus 20 notifies the user A that the installation has been completed by displaying a message to this effect on the display unit 202 (S512), and finishes the process.

Through the foregoing process according to the embodiment 2, the user can add the function information to the terminal 10 simply by bringing the repeater apparatus 22 closely opposite the terminal 10 once, when the user wishes to install the function information in the terminal 10. In addition, the user can obtain the plurality of pieces of terminal information at a time. Accordingly, for example in the case of adding the function information to a plurality of apparatuses such as home electric appliances at a time, the menu selection can be done through a single step, after which all the user has to do is bringing the repeater apparatus 22 closely opposite each terminal. Thus, the foregoing arrangement significantly improves the operation efficiency.

Regarding the process of displaying the message urging the user to bring the repeater apparatus 22 closely opposite the terminal according to the embodiment 2, the repeater apparatus 22 may notify the user, before displaying such a message, to which terminal the acquired information corresponds, on the basis of the terminal near-field ID 2077 stored in the near-field communication memory 207.

In the case where the user selects any of "1. See operation manual", "2. See use history information", or "3. Make up function information" in FIG. 19, the repeater apparatus 22 may download the information related to all the terminals with respect to which the user A is registered as the user in the server 30, so as to display the information corresponding to the terminal 10 close to which the user A has brought the repeater apparatus 22 thereafter, as in the case of "4. Use function information".

Figure 20:
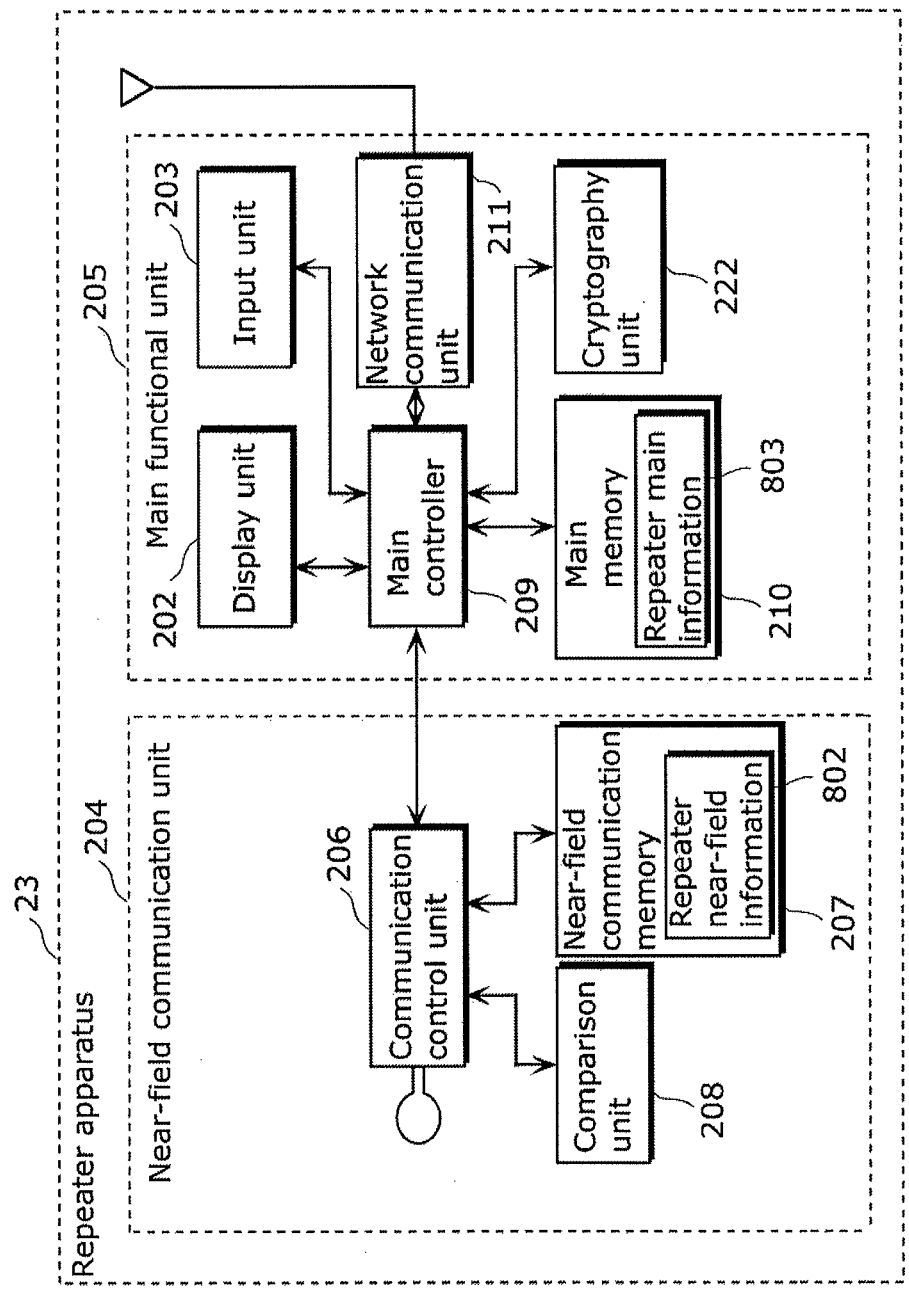
FIG. 20 is a block diagram showing a configuration of a repeater apparatus according to a variation of the embodiment 2.

Although the digital signature is employed in the embodiment 2, naturally the information itself to be transmitted from the server 30 may be encrypted, and the repeater apparatus may decrypt the information received from the server 30. FIG. 20 is a block diagram showing a configuration of a repeater apparatus 23 for the case where the information itself to be transmitted from the server 30 is encrypted. The repeater apparatus 23 is different from the repeater apparatus 22 shown in FIG. 17 in including a cryptography unit 222 instead of the security verification unit 221.

The cryptography unit 222 decrypts the information received from the server 30. After that, the repeater apparatus 23 stores the decrypted information in the near-field communication memory 207. Such an arrangement also offers the same advantage as described above.

Figure 21:
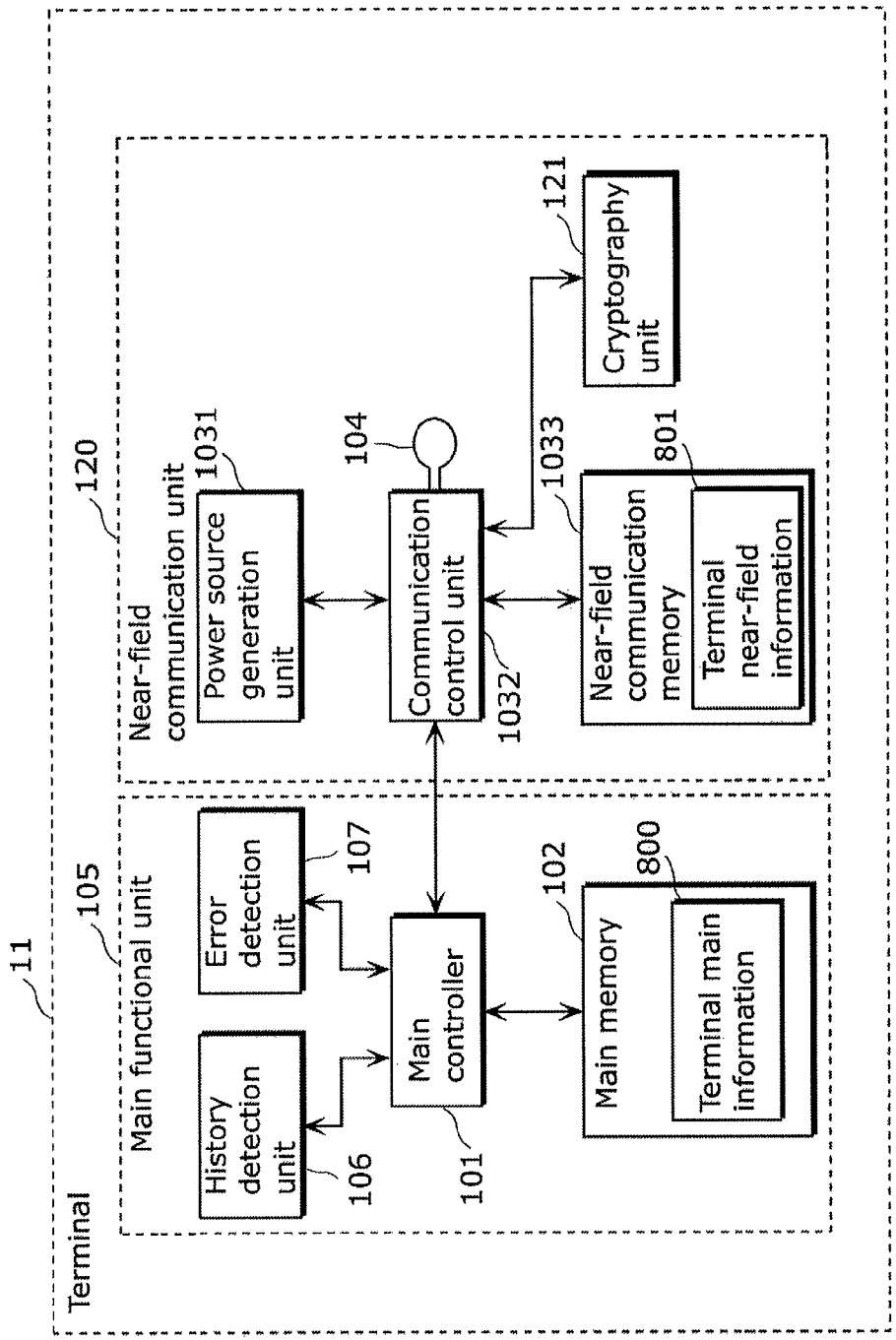
FIG. 21 is a block diagram showing a configuration of a terminal according to a variation of the embodiment 2.

Alternatively, the repeater apparatus 23 may decrypt only the information for identifying the terminal 10, for example the terminal near-field ID 2077, among the information received from the server 30, and the terminal may decrypt the function information. FIG. 21 is a block diagram showing a configuration of a terminal 11 that decrypts the function information. A near-field communication unit 120 of the terminal 11 further includes a cryptography unit 121. With such a configuration, the terminal 11 decrypts the information received from the repeater apparatus 23 at the cryptography unit 121, and stores the decrypted information in the near-field communication memory 1033. Here, it is preferable that the cryptogram be arranged such that the repeater apparatus 23 is unable to decrypt but only the server 30 or the terminal 11 can decrypt. In this case, for example, even though a malicious repeater apparatus attempts to make up unauthorized function information and install such information in the terminal 11, the function information from the legitimate server 30 can be harmlessly transmitted to the terminal 11, which is the only party that can decrypt the function information. Thus, the terminal can be securely protected from such an unauthorized act.

Further, it is preferable that the cryptography unit 121 encrypt the terminal inherent information 10331, the server access information 10332, and the temporary information 10333, before transmitting these pieces of information to the repeater apparatus 23. Such an arrangement allows the information cited above to be harmlessly transmitted to the server 30 since the information can only be decrypted by the server 30, even though a malicious repeater apparatus attempts to transmit the important terminal information to an unauthorized server for analyzing the same. Thus, the terminal information can be securely protected from such an unauthorized act. If the history information were readable from any type of repeater apparatus, the history information could be read out by a repeater apparatus of a manufacturer different from the manufacturer of the terminal 11. In this case, valuable information such as the user's operation history may be exposed to other manufacturers.

3. Embodiment 3

Hereafter, an embodiment 3 of the present invention will be described in details referring to the drawings. According to the embodiments 1 and 2, the user A transmits and receives information such as the function information 3242 made up by the user A, by using the application installed in advance in the repeater apparatus 20. In the embodiment 3, in contrast, a user B who is different from the user A installs the function information determined in advance by the user A in the terminal 10. In addition, according to the embodiment 3, the user B can download the function information and install it in the terminal 10 simply by bringing the repeater apparatus 20 closely opposite the terminal 10, without the need to intentionally activate the application.

A communication system according to the embodiment 3 includes a repeater apparatus 24 the owner (primary user) of which is the user B, in addition to the configuration of the communication system 1 according to the embodiment 1 shown in FIG. 3. However, the configuration of the repeater apparatus 24 is the same as that of the repeater apparatus 20, and therefore the following description refers to a process in which the user B installs the function information determined in advance by the user A in the terminal 10. In the following description, the primary user of the repeater apparatus 20 will be referred to as user A, as in the description of the embodiment 1.

Figure 22A:
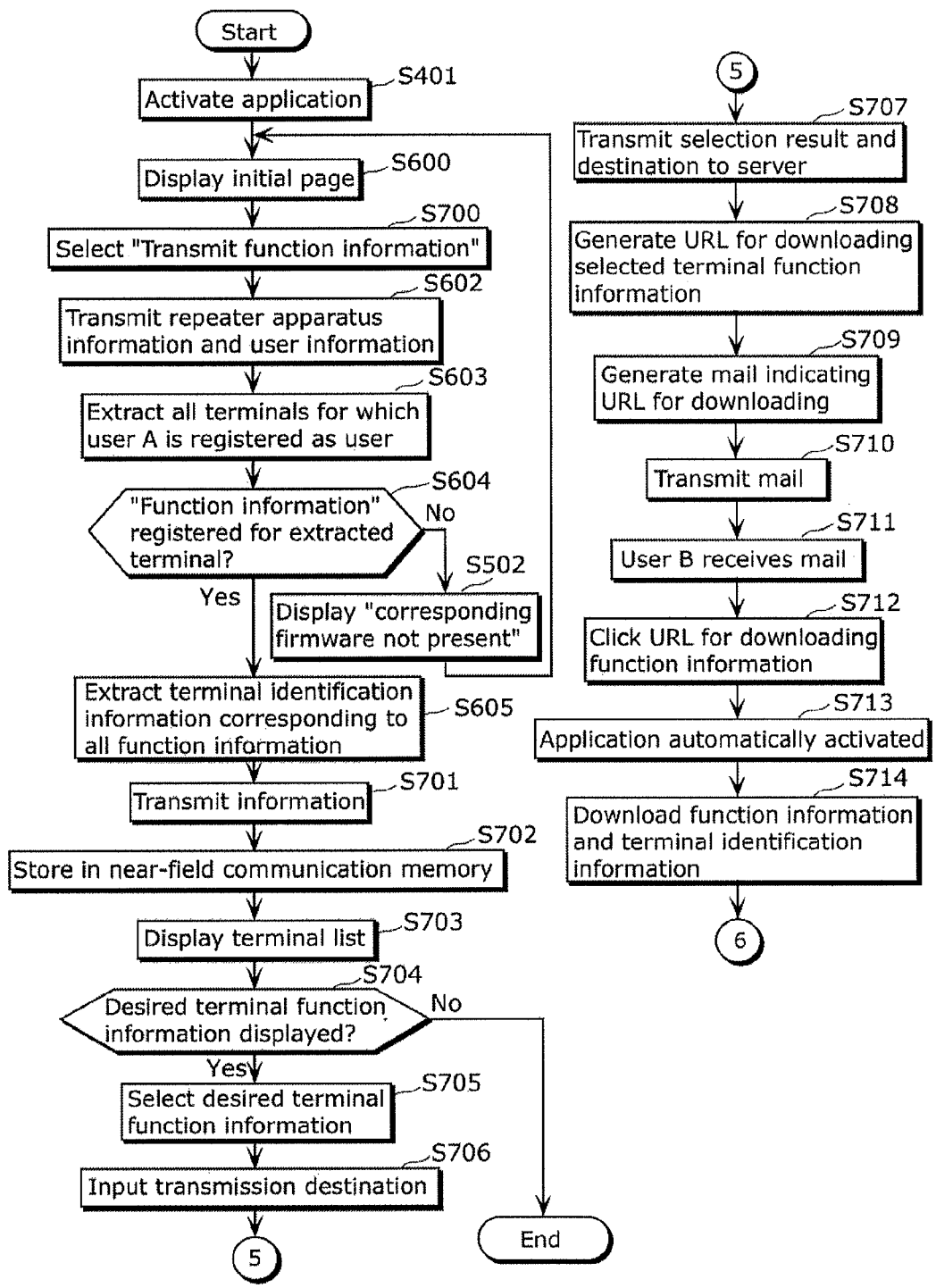
FIG. 22A is a flowchart showing a process of installing function information in a terminal, according to an embodiment 3 of the present invention.
Figure 22B:
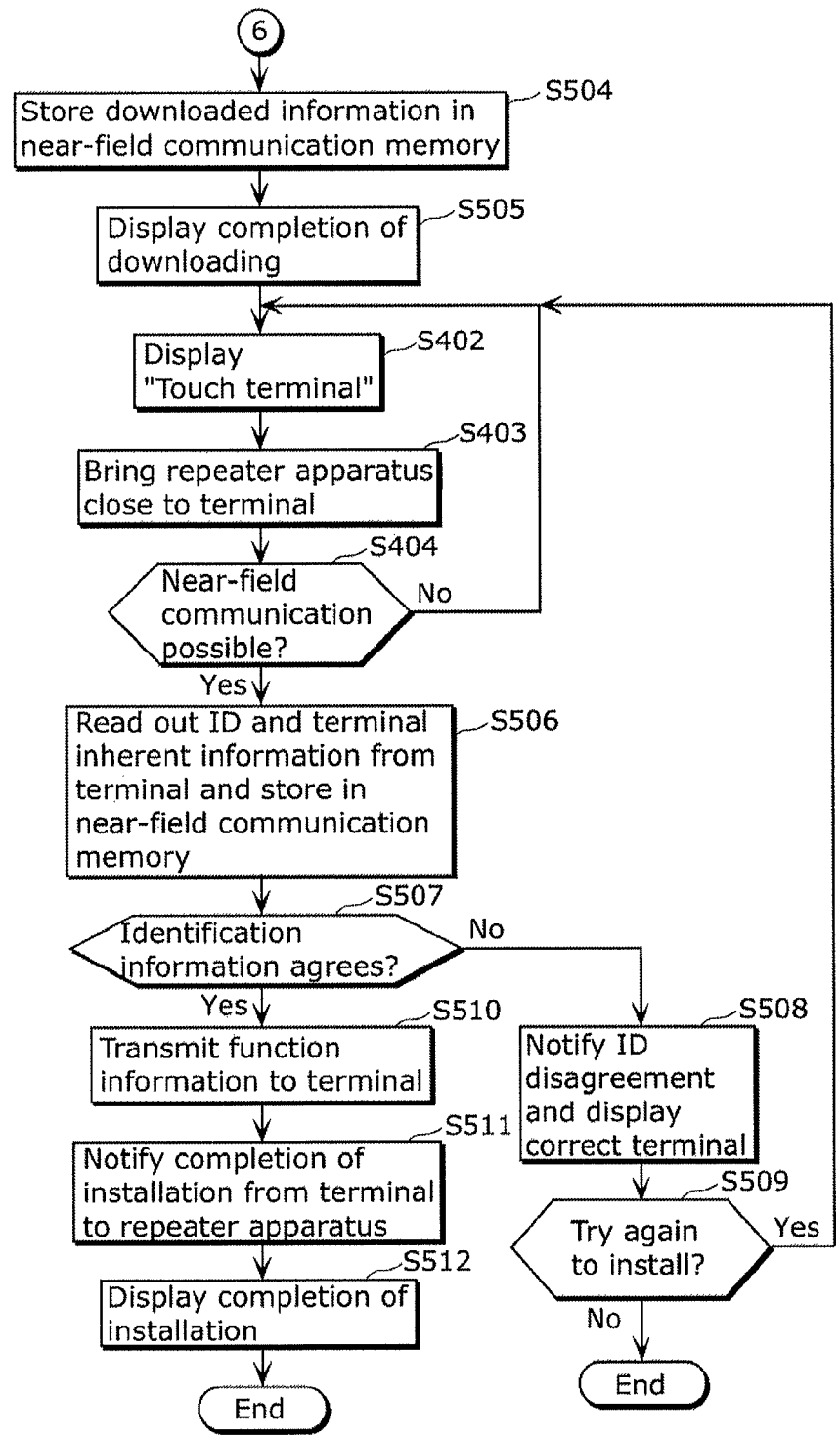
FIG. 22B is a flowchart showing a process of installing the function information in the terminal subsequent to FIG. 22A, according to the embodiment 3.

FIGS. 22A and 22B are flowcharts showing a process in which the user B installs the function information determined in advance by the user A in the terminal 10. In FIGS. 22A and 22B, the same steps as those of FIG. 11, FIG. 15, or FIG. 18 are given the same numeral, and the description thereof will not be repeated.

First, the user A activates an exclusive application installed in advance in the repeater apparatus 20 (S401). Once activated, the application displays an initial page (S600). The content of the initial page displayed at this point is the same as FIG. 19. For the purpose of description, it is assumed that the user A selects "5. Transmit function information" (S700).

In accordance with such selection, the repeater apparatus 20 transmits the repeater apparatus information 2100 and the user information 2101 to the server 30 (S602).

The server 30 extracts all the terminals with respect to which the user A is registered as the user, on the basis of the received information (S603). The server 30 further extracts the registered function information 3242 with respect to all the extracted terminals, and switches the subsequent operation depending on the result (S604). More specifically, in the case where the function information 3242 is not registered with respect to any of the terminals to be used by the user A (No at S604), the server 30 transmits a message to the effect that function information 3242 that can be downloaded is unavailable, to the repeater apparatus 20. Upon receipt of such a message, the repeater apparatus 20 displays the same message on the display unit 202 to thereby notify the user A that downloadable function information 3242 is unavailable (S502), and resets the display to the initial page (S600).

In contrast, in the case where the function information 3242 is registered for any of the plurality of terminals to be used by the user A (Yes at S604), the server 30 extracts all of such function information 3242, the function version information 3241 of each function information, and information for identifying which function information is exclusive to which of the terminals (S605), which is for example the terminal near-field ID. The server 30 then transmits the extracted information to the repeater apparatus 20 (S701).

The repeater apparatus 20 stores the received information in the near-field communication memory 207 (S702), and displays on the display unit 202 a list of the function information and the terminals corresponding to the function information registered in the server 30, on the basis of the received terminal near-field ID (S703).

Figure 23:
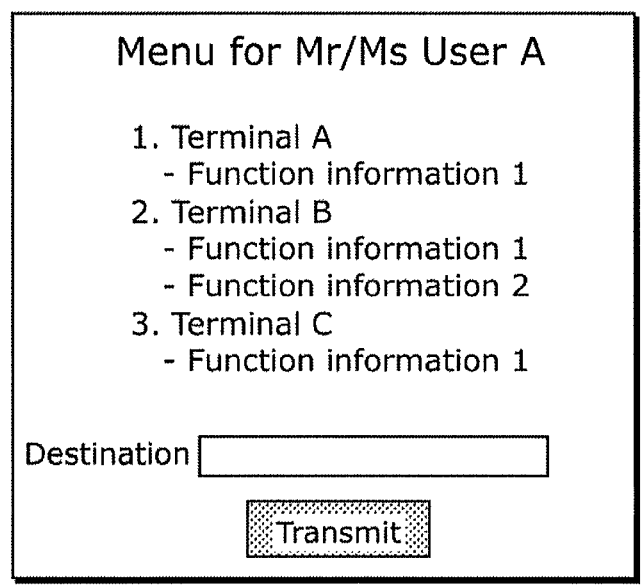
FIG. 23 is a schematic drawing showing an example of display content according to the embodiment 3.

FIG. 23 is a schematic drawing showing an example of the list of the function information and the terminals corresponding to the function information registered by the user A in the server 30. The user A checks whether the list contains the function information for the terminal that the user A wishes to transmit to the user B (S704). In the case where the function information for the terminal that the user A wishes to transmit to the user B is not displayed (No at S704), the user A finishes the process. Thereafter, the user A may reactivate the application and make up the function information for the desired terminal.

In contrast, in the case where the function information for the terminal that the user A wishes to transmit to the user B is displayed (Yes at S704), the user A selects the function information for the terminal to be transmitted to the user B (S705).

The user A then inputs information of the transmission destination (S706), and presses the transmission button. At this point, the repeater apparatus 20 transmits the selection result of the user A and the information of the transmission destination, to the server 30 (S707).

Upon repeater of the information from the apparatus 20, the server 30 generates the URL from which the selected function information for the terminal can be downloaded (S708), and generates a method for notifying the URL to the transmission destination (S709). The method for notifying may be an e-mail for example, and the server 30 transmits the e-mail (S710). It is preferable that the e-mail transmitted at this stage be composed such that once the user B, the receiver of the e-mail, clicks the URL the application installed in advance in the repeater apparatus 24 owned by the user B is automatically activated. Such an arrangement enables the user B to automatically activate the application simply by clicking the URL contained in the e-mail, and to thereby download the function information for the terminal.

Upon receipt of the e-mail transmitted from the server 30 (S711), the user B clicks the URL for downloading the function information contained in the e-mail (S712). With such an action, the repeater apparatus 24 automatically activates the application installed in advance (S713), and downloads the corresponding function information 3242, the function version information 3241, and the terminal inherent information 321 from the URL (S714). The information thus downloaded is stored in the near-field communication memory 207 of the repeater apparatus 24 (S504). When the downloading is completed, the repeater apparatus 24 displays a message to the effect that the downloading has been completed, on the display unit 202 (S505). The repeater apparatus 24 thus notifies the user B that the downloading has been completed.

Thereafter, the user B installs the function information in the terminal 10, through the same process as described in the embodiment 1.

Through the foregoing process according to the embodiment 3, the user B can download the function information for the terminal selected by the user A, on the basis of the information transmitted from the server 30. Accordingly, the user B can install the function information in the corresponding terminal, without the need to activate an exclusive application. Therefore, even though the user B is not familiar with the operation of the repeater apparatus, the user B can easily utilize the function information. In addition, the user A can transmit the URL for downloading to any desired user, by inputting the transmission destination. Accordingly, the information can be transmitted even to a user not registered in the terminal, and such an unregistered user can also utilize the function information. Therefore, in the case where the user to whom the function information has been transmitted is not yet registered as the user of the terminal 10, a process in which the unregistered user is registered as the user of the terminal 10 may be performed after the function information is utilized. In this case, the registration may be performed either by the user A or the unregistered user.

According to the embodiment 3, the user A inputs the transmission destination. Instead, the information of the registered users of the terminal may be transmitted from the server 30 to the repeater apparatus 20 of the user A at the same time that the function information and the terminal ID are received from the server 30, and the repeater apparatus 20 may display the information of the registered users as list of transmission destinations. Such an arrangement exempts the user A from the trouble of manually inputting the destination, and prevents transmission of the information to a wrong person.

Although the user A only inputs the transmission destination according to the embodiment 3, the user A may also input a message to the user B. In this case, various types of information can be notified to the user B, such as for which terminal the function information is being transmitted.

In the embodiments 1, 2, and 3 of the present invention, the terminal information 2071 and the download information 2072 in the near-field communication memory 207 may be preserved after the installation is completed. In this case, it is only the version information that has to be compared when the information is to be reinstalled, and therefore the communication with the server 30 can be simplified. Conversely, the terminal information 2071 and the download information 2072 in the near-field communication memory 207 may be deleted after the installation is completed. In this case, the limited memory region in the repeater apparatus can be efficiently utilized.

The processing units provided in the terminal 10, 11, the repeater apparatus 20, 22, 23, 24, and the server 30 according to the foregoing embodiments 1, 2, and 3 may be typically realized in a form of an LSI. The processing units may be separately implemented in a respective chip, or a part or whole of those units may be implemented in a single chip. Alternatively, such circuit integration may be realized in an exclusive circuit or a general-purpose processor, other than the LSI. A field programmable gate array (FPGA) that can be programmed after manufacturing the LSI, or a reconfigurable processor that accepts rearrangement of circuit cells in the LSI may also be employed.

Also, a part or whole of the functions of the terminal 10, 11, the repeater apparatus 20, 22, 23, 24, and the server 30 according to the embodiments 1, 2, and 3 may be realized by causing a processor such as a CPU to execute the corresponding programs.

The present invention may be the foregoing program, or a non-transitory computer-readable recording medium containing that program. Naturally, such a program can be distributed through a communication medium such as the internet.

Further, at least a part of the functions of the terminal 10, 11, the repeater apparatus 20, 22, 23, 24, and the server 30 according to the embodiments 1, 2, and 3 and variations thereof may be combined.

The numerical values cited in the foregoing description are merely for specifically explaining the present invention, and in no way for limiting the present invention.

Further, the sequence of the steps shown in FIGS. 11, 12, 15, 16, 18, 22A and 22B are merely exemplary, and may be modified as long as the same advantageous effect can be secured. In addition, a part of the foregoing steps may be performed simultaneously (in parallel) with another part of the steps.

Further, modifications that can be reached by those skilled in the art and made to the foregoing embodiment are included in the present invention, unless deviating from the scope and spirit of the present invention.

The present invention is applicable to a communication apparatus, a communication system and a communication method, and particularly advantageous when applied to a communication apparatus configured to perform near-field communication and to transmit information received from a server to a terminal corresponding to the information.

The invention claimed is:

1. A communication method performed by a communication apparatus that communicates with a terminal by near-field communication and with a server through a network, the communication method comprising:

acquiring, by near-field communication from a terminal to communicate with, second terminal identification information for identifying the terminal to communicate with, the second terminal identification information being stored in the terminal to communicate with;

transmitting the second terminal identification information to the server through the network, and acquiring control information for controlling the terminal identified by the second terminal identification information and first terminal identification information for identifying a terminal to be controlled by the control information, from the server through the network;

deciding whether the first terminal identification information and the second terminal identification information agree with each other, after the control information is acquired; and transmitting the control information by near-field communication to the terminal to communicate with, in the case where it is decided in the deciding that the first terminal identification information and the second terminal identification information agree with each other.

2. A communication method performed by a communication apparatus that communicates with a terminal by near-field communication and with a server through a network, the communication method comprising:

acquiring, by near-field communication from a terminal to communicate with, second terminal identification information for identifying the terminal to communicate with, the second terminal identification information being stored in the terminal to communicate with;

transmitting the second terminal identification information to the server through the network, and acquiring control information for controlling the terminal identified by the second terminal identification information and first terminal identification information for identifying a terminal to be controlled by the control information, from the server through the network;

after the control information is acquired, acquiring, by near-field communication from a terminal to communicate with, third terminal identification information for identifying the terminal to communicate with, and deciding whether the first terminal identification information and the third terminal identification information agree with each other, the third terminal identification information being stored in the terminal to communicate with; and transmitting the control information by near-field communication to the terminal to communicate with that is identified by the third terminal identification information, in the case where it is decided in the deciding that the first terminal identification information and the third terminal identification information agree with each other.

3. A communication method performed by a communication apparatus that communicates with a terminal by near-field communication and with a server through a network, the communication method comprising:

acquiring, by near-field communication from a terminal to communicate with, second terminal identification information for identifying the terminal to communicate with, the second terminal identification information being stored in the terminal to communicate with;

transmitting the second terminal identification information to the server through the network, and acquiring control information for controlling the terminal identified by the second terminal identification information from the server through the network;

after the control information is acquired, acquiring, by near-field communication from a terminal to communicate with, third terminal identification information for identifying the terminal to communicate with, and deciding whether the second terminal identification information and the third terminal identification information agree with each other, the third terminal identification information being stored in the terminal to communicate with; and transmitting the control information by near-field communication to the terminal to communicate with that is identified by the third terminal identification information, in the case where it is decided in the deciding that the second terminal identification information and the third terminal identification information agree with each other.

4. A communication apparatus that communicates with a terminal by near-field communication and with a server through a network, the communication apparatus comprising:
- a first near-field communication unit configured to acquire, by near-field communication from a terminal to communicate with, second terminal identification information for identifying the terminal to communicate with, the second terminal identification information being stored in the terminal to communicate with;
- a network communication unit configured to transmit the second terminal identification information to the server through the network, and acquire control information for controlling the terminal identified by the second terminal identification information and first terminal identification information for identifying a terminal to be controlled by the control information, from the server through the network; and
- a comparison unit configured to decide whether the first terminal identification information and the second terminal identification information agree with each other, after the control information is acquired,
- wherein the first near-field communication unit is configured to transmit the control information by near-field communication to the terminal to communicate with, in the case where the comparison unit decides that the first terminal identification information and the second terminal identification information agree with each other.

5. A communication apparatus that communicates with a terminal by near-field communication and with a server through a network, the communication apparatus comprising:
- a first near-field communication unit configured to acquire, by near-field communication from a terminal to communicate with, second terminal identification information for identifying the terminal to communicate with, the second terminal identification information being stored in the terminal to communicate with;
- a network communication unit configured to transmit the second terminal identification information to the server through the network, and acquire control information for controlling the terminal identified by the second terminal identification information and first terminal identification information for identifying a terminal to be controlled by the control information, from the server through the network; and
- a comparison unit configured to acquire, by near-field communication from a terminal to communicate with, third terminal identification information for identifying the terminal to communicate with, and to decide whether the first terminal identification information and the third terminal identification information agree with each other, after the control information is acquired, the third terminal identification information being stored in the terminal to communicate with,
- wherein the first near-field communication unit is configured to transmit the control information by near-field communication to the terminal to communicate with that is identified by the third terminal identification information, in the case where the comparison unit decides that the first terminal identification information and the third terminal identification information agree with each other.

6. A communication apparatus that communicates with a terminal by near-field communication and with a server through a network, the communication apparatus comprising:
- a first near-field communication unit configured to acquire, by near-field communication from a terminal to communicate with, second terminal identification information for identifying the terminal to communicate with, the second terminal identification information being stored in the terminal to communicate with;
- a network communication unit configured to transmit the second terminal identification information to the server through the network, and acquire control information for controlling the terminal identified by the second terminal identification information from the server through the network; and
- a comparison unit configured to acquire, by near-field communication from a terminal to communicate with, third terminal identification information for identifying the terminal to communicate with, and to decide whether the second terminal identification information and the third terminal identification information agree with each other, after the control information is acquired, the third terminal identification information being stored in the terminal to communicate with,
- wherein the first near-field communication unit is configured to transmit the control information by near-field communication to the terminal to communicate with that is identified by the third terminal identification information, in the case where the comparison unit decides that the second terminal identification information and the third terminal identification information agree with each other.

* * * * *